United States Patent
Maeta et al.

(10) Patent No.: US 7,538,155 B2
(45) Date of Patent: May 26, 2009

(54) METHOD OR PRODUCING AN ORGANIC PIGMENT DISPERSION LIQUID AND ORGANIC PIGMENT FINE PARTICLES OBTAINED BY THE METHOD

(75) Inventors: Hideki Maeta, Kanagawa-ken (JP); Tadahisa Sato, Kanagawa-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 11/480,401

(22) Filed: Jul. 5, 2006

(65) Prior Publication Data

US 2007/0012221 A1 Jan. 18, 2007

(30) Foreign Application Priority Data

Jul. 6, 2005 (JP) ............................ 2005-197971
Mar. 22, 2006 (JP) ............................ 2006-078637

(51) Int. Cl.
*C08G 18/63* (2006.01)
*C08G 18/08* (2006.01)
*C08K 5/16* (2006.01)
*C08K 5/00* (2006.01)
*C08F 2/16* (2006.01)
*C08F 2/22* (2006.01)
*C09B 48/00* (2006.01)

(52) U.S. Cl. .................. 524/700; 524/714; 524/800; 524/804; 106/493; 106/497; 106/498

(58) Field of Classification Search ................ 524/700, 524/714, 800, 804; 106/493, 497, 498
See application file for complete search history.

(56) References Cited

U.S. PATENT DOCUMENTS

| | | | |
|---|---|---|---|
| 3,133,893 A * | 5/1964 | Newman | .............. 524/720 |
| 6,537,364 B2 * | 3/2003 | Dietz et al. | .............. 106/493 |
| 6,921,433 B2 | 7/2005 | Kuribayashi et al. | |
| 2002/0077385 A1 * | 6/2002 | Miyabayashi | .............. 523/160 |
| 2004/0009294 A1 | 1/2004 | Kuribayashi et al. | |
| 2005/0075416 A1 | 4/2005 | Miyabayashi | |

FOREIGN PATENT DOCUMENTS

| | | | |
|---|---|---|---|
| EP | 1 516 896 A1 | | 3/2005 |
| EP | 1516896 A1 * | | 3/2005 |
| JP | 10-316909 A | | 12/1998 |
| JP | 2004-043776 A | | 2/2004 |

* cited by examiner

*Primary Examiner*—Vasu Jagannathan
*Assistant Examiner*—Karuna P Reddy
(74) *Attorney, Agent, or Firm*—Birch, Stewart, Kolasch & Birch, LLP

(57) ABSTRACT

A method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

22 Claims, 12 Drawing Sheets

F I G. 1-2
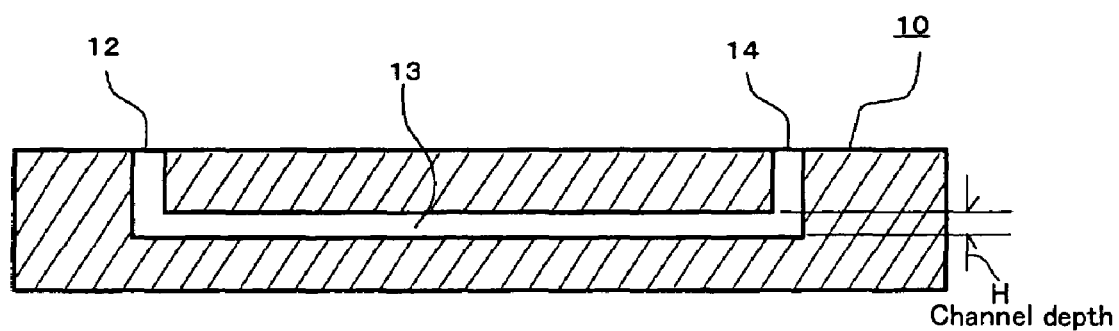

F I G. 3-1
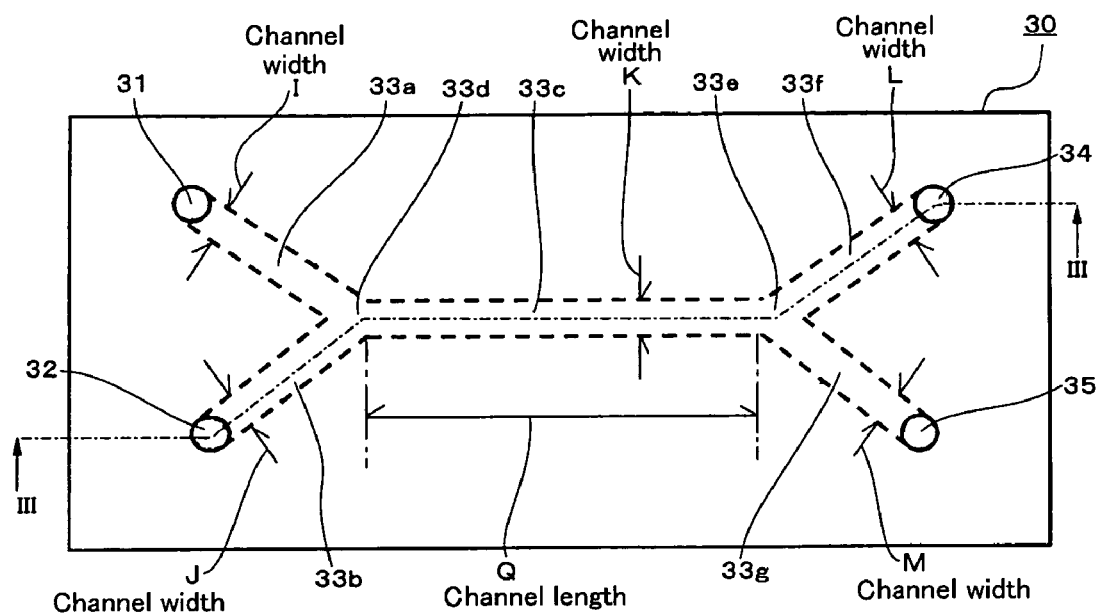

F I G. 3-2
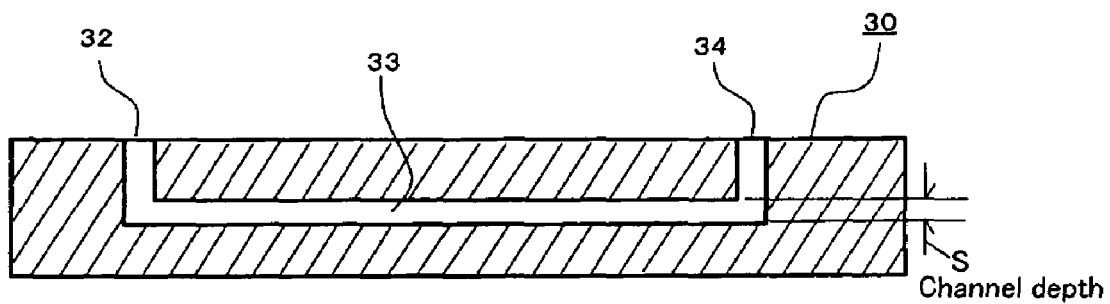

F I G. 8
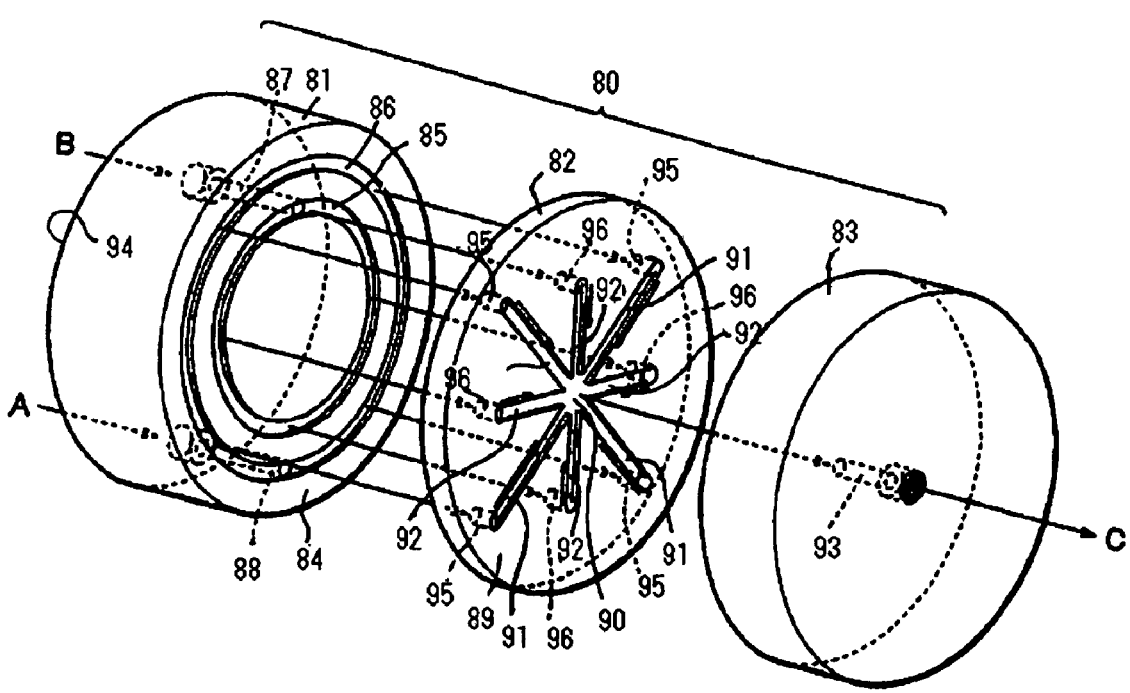

METHOD OR PRODUCING AN ORGANIC PIGMENT DISPERSION LIQUID AND ORGANIC PIGMENT FINE PARTICLES OBTAINED BY THE METHOD

FIELD OF THE INVENTION

The present invention relates to a method of producing an organic pigment dispersion liquid, and to organic pigment fine particles obtained by the method. More specifically, the present invention relates to a method of producing an organic pigment dispersion liquid by forming organic pigment fine particles in the presence of a polymerizable compound and polymerizing it, and to organic pigment fine particles obtained by the method. Further specifically, the present invention relates to a method of producing an organic pigment dispersion liquid by immobilizing a polymerizable compound through polymerization with respect to pigment fine particles obtained in a micro-reaction site, and to organic pigment fine particles obtained by the method.

BACKGROUND OF THE INVENTION

Pigments generally exhibit vivid color tone and high coloring power, and they are widely used in many fields. Examples of use applications in which pigments are used include paints, printing inks, electrophotographic toners, ink-jet inks, and color filters. Pigments are thus important compounds indispensable in everyday life at the present time. General properties, classification by use, and other aspects of pigments are described in, for example, "Dispersion Stabilization of Pigment and Surface Treatment Technique/Evaluation", Technical Information Institute Co., Ltd., 2001, pp. 123-224. In particular, examples of pigments that require high performance, and that are of particular importance in practical use, are ink-jet ink pigments, and color filter pigments.

As the coloring material for ink-jet ink, dyes have been used, but they have points to be improved as to water resistance and light resistance. To improve them, pigments have come to be used. Images obtained from pigment inks have remarkable advantages of superior light resistance and water resistance compared with images obtained from dye-based inks. However, pigments are not easily formed uniformly and pulverized into fine-particles of a nanometer size (i.e., mono-dispersion), which can permeate pores in the surface of paper, and hence pigments in the image are poor in close bindness to the paper. Consequently, improvement thereof has been demanded.

An exemplary important application of a pigment includes a color filter used for a CCD sensor. In particular, recently, there is a demand for a reduction in thickness of the color filter along with an increase in the number of pixels of a digital camera. An organic pigment is used in the color filter, and a thickness of the color filter substantially depends upon a diameter of a particle of the organic pigment. Therefore, even in this field, there is a demand for producing fine particles that are stable in monodispersion at a nanometer size level under control.

A method of producing organic pigment fine particles is roughly classified into a brake-down method of producing fine particles from a bulk substance by crushing or the like, and a build-up method of producing fine particles by particle growth in a vapor phase or a liquid phase (see "Experimental Chemical Lecture, 4$^{th}$ Edition" edited by the Chemical Society of Japan (Maruzen Co., Ltd.), vol. 12, pp. 411-488, etc.). In general, the breakdown method (crushing method) is widely used. However, according to this method, it is difficult to obtain an organic substance with a nanometer size level, the productivity is remarkably low, and substances applicable in this method are limited.

As a procedure for compensating for the above disadvantage, encapsulating pigment fine particles with resin has been proposed. (Technical Information Association "Preparation and Dispersion/Aggregation Control of nano-fine particles and evaluation thereof" 2003, Ch. 1, Sec. 4, (various synthesis methods of polymer-nano-fine particles and problems); Kengo YASUI, Kozue SUNOUCHI (Dainippon Ink and Chemicals, Inc.) "Increase in Resolution with Aqueous Pigment Ink" DIC TECH REV, 2004, No. 10, pp. 11-18; Hiroshi HARADA, Sadahiro INOUE (Dainippon Ink and Chemicals, Inc.) "Microcapsulated Pigment Jet Ink" DIC Tech Rev, 2003, No. 9, pp. 1-7; Masao TANAKA (Dainippon Ink and Chemicals, Inc.) "Micro/Nano Capsul Technique, Microcapsulation of Pigment, and Application to Ink Jet" Industrial Material, 2004, Vol. 52, No. 6, pp. 42-45, etc.). According to this method, an attempt is made so as to enhance water resistance and light resistance, and to increase a gloss regarding printing. However, the recent demand for the increase in resolution has not been satisfied sufficiently. This is because those methods depend upon the breakdown method, and fine particles cannot be regulated to a desired minute size. Further, this method requires to fine particles by grinding as much as possible, and to adsorb resins to the particles completely, which takes a great amount of time and energy in terms of the productivity.

On the other hand, it is conducted that a pigment is dispersed with a dispersant. In this case, merely by allowing the dispersant to adsorb to the surface of the pigment, long-term stability, water resistance, and viscosity stability are insufficient. Further, when such the pigment is used as ink-jet ink, due to the strong shear force at a time of the discharge from a nozzle, the dispersant desorbs from the pigment, deteriorates, and further clogs the nozzle, etc.

As to the above-mentioned subjects, a number of methods have been studied. Examples of the methods include chemical reforming of the surface of a pigment by oxidation or the like, and a chemical bond formation or the like of a pigment surface and a dissoluble group by grafting or the like (see JP-A-H 10-316909, "JP-A" means unexamined published Japanese patent application.). However, according to any of those methods, it is difficult to effect a reaction completely. As a result, quality of an obtained dispersion liquid can not be improved. The increase in a content of a dispersant can also be considered so as to ensure the stability. However, there arise the decrease in printing performance and the excessive increase in viscosity.

Further, a method of adding a polymerizable surfactant to a pigment obtained by a breakdown method, followed by emulsion polymerization (see JP-A-2005-97517). However, in the emulsion polymerization disclosed herein, in order to allow a monomer completely to adsorb to the surfaces of pigment fine particles, a great amount of monomer is required. This method also depends upon the breakdown method, so that the size of a pigment is large, and it is necessary to make the pigment uniform in a finer size range. Further, according to this method, the energy consumption amount is large, since a crushing step is required, and it is necessary to switch the step facility so as to effect a polymerization reaction, resulting in low productivity.

Contrary to this, recently, a method of producing organic fine particles with a nanometer size by a build-up method has been studied. For example, there is a production method by a micro-chemical process (see European Patent Publication No. 1516896 A1). However, the recent high demand with respect to ink-jet ink etc. is not satisfied, and there is still a demand for further improvement and development.

SUMMARY OF THE INVENTION

The present invention resides in a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

Other and further features and advantages of the invention will appear more fully from the following description, with taken in connection with the accompanying drawings.

BRIEF DESCRIPTION OF THE DRAWINGS

FIG. 1-2 is a sectional view taken on line I-I of FIG. 1-1.

FIG. 2-1 is an explanatory view of one embodiment of a reactor for use in a method of the present invention, the reactor which has a cylindrical tube-type channel in which a channel is provided to insert at one side thereof.

FIG. 2-2 is a sectional view taken on line IIa-IIa of FIG. 2-1.

FIG. 2-3 is a sectional view taken on line IIb-IIb of FIG. 2-1.

FIG. 3-1 is an explanatory view of one embodiment of a reactor for use in a method of the present invention, the reactor which has Y-shaped channels on both sides.

FIG. 3-2 is a sectional view taken on line III-III of FIG. 3-1.

FIG. 8 is an exploded perspective view showing an exploded state of one embodiment of a three-dimensional micro-reactor for use in a method of the present invention.

DETAILED DESCRIPTION OF THE INVENTION

Figure 1:
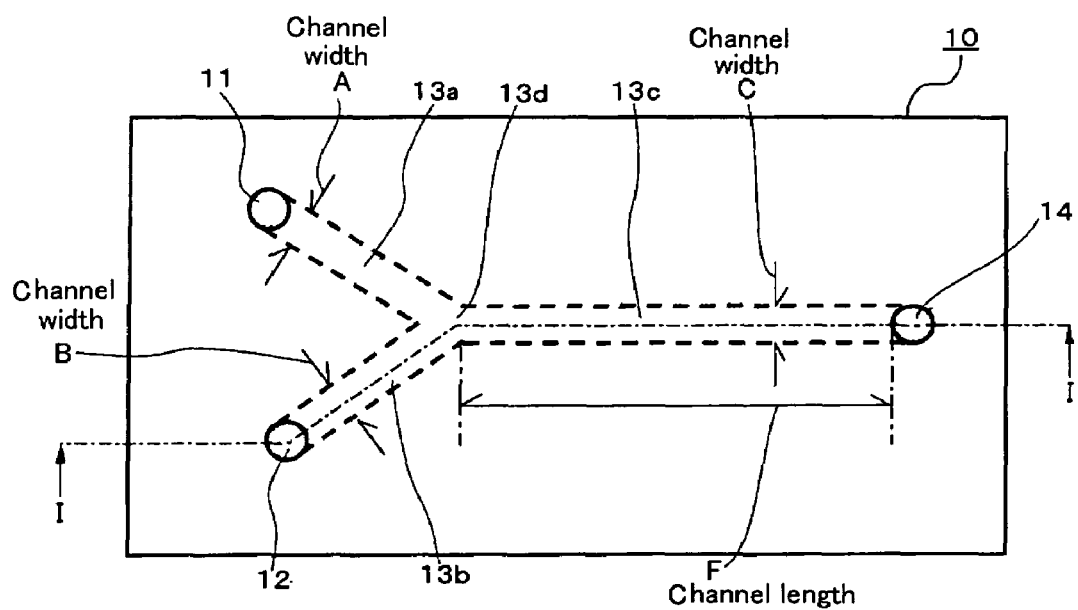
FIG. 1-1 is an explanatory view of one embodiment of a reactor for use in a method of the present invention, the reactor which has a Y-shaped channel on one side.

According to the present invention, there is provided the following means:

(1) A method of producing an organic pigment dispersion liquid, which comprises the steps of: providing an alkaline or acidic solution with an organic pigment dissolved therein and an aqueous medium, wherein a polymerizable compound is contained in at least one of the organic pigment solution and the aqueous medium;
mixing the solution and the aqueous medium; and thereby forming the pigment as fine particles, then polymerizing the polymerizable compound to form a polymer immobile from the pigment fine particles.

(2) The method of producing an organic pigment dispersion liquid according to item (1), wherein the solution of which the organic pigment is dissolved is alkaline solution.

(3) The method of producing an organic pigment dispersion liquid according to item (1), wherein the organic pigment solution is a homogeneous solution in which the organic pigment is dissolved in a homogeneous mixed solvent of water and an organic solvent.

(4) The method of producing an organic pigment dispersion liquid according to item (1), further comprising the step of changing a hydrogen ion exponent (pH) in the course of mixing the organic pigment solution and the aqueous medium.

(5) The method of producing an organic pigment dispersion liquid according to item (1), further comprising the steps of: flowing the organic pigment solution and the aqueous medium into a channel having an equivalent diameter of 1 mm or less to be a continuous liquid flow; and mixing said solution and said medium for bringing them into contact each other.

(6) The method of producing an organic pigment dispersion liquid according to item (1), further comprising the steps of: flowing the organic pigment solution and the aqueous medium into a channel to be a laminar flow; and bringing said solution and said medium into contact each other in the course of the laminar flow.

(7) The method of producing an organic pigment dispersion liquid according to item (6), wherein the channel is a micro-reaction site.

(8) The method of producing an organic pigment dispersion liquid according to item (7), wherein an equivalent diameter of the channel is 10 mm or less.

(9) The method of producing an organic pigment dispersion liquid according to item (1), wherein the polymerizable compound is a polymerizable surfactant.

(10) The method of producing an organic pigment dispersion liquid according to item (1), wherein at least one dispersing agent is contained in at least one of the organic pigment solution and the aqueous medium.

(11) The method of producing an organic pigment dispersion liquid according to item (10), wherein at least one of the dispersing agents is a polymer dispersing agent.

(12) The method of producing an organic pigment dispersion liquid according to item (1), wherein at least one monomer copolymerizable with the polymerizable compound is contained in at least one of the organic pigment solution and the aqueous medium.

(13) The method of producing an organic pigment dispersion liquid according to item (1), wherein organic pigment fine particles are obtained in a dispersion liquid.

(14) The method of producing an organic pigment dispersion liquid according to item (6), wherein an equivalent diameter of the channel is 1 mm or less.

(15) Organic pigment fine particles obtained in accordance with a method of item (1), wherein a mode diameter of the fine particles is 1 µm or less.

As a result of an intensive study, the inventors of the present invention found the following: by synthesizing an organic pigment from a solution containing a reaction component in the presence of a polymerizable compound, and polymerizing the polymerizable compound in this state, a stable organic pigment fine particles with satisfactory purity can be obtained rapidly under a gentle condition. More specifically, the inventors of the present invention found the following: obtaining minute pigment fine particles by a build-up method, concurrently, incorporating a polymerizable compound into the reaction solution as an integrated portion, and polymerizing it in this state, the polymerizable compound can be immobilized from the fine particles densely and uniformly, and thereby organic pigment fine particles excellent in dispersion stability and long-term storage stability and a dispersion thereof can be obtained. Thus, we have achieved the present invention. Hereinafter, the present invention will be described in detail.

According to a method of producing an organic pigment dispersion liquid of the present invention, a solution with an organic pigment dissolved therein and an aqueous medium are mixed, and in the course of the mixing, the pigment can be allowed to form (precipitate) as fine particles. Examples of the method of mixing include a method of pouring the aqueous medium in the organic pigment solution, a method of pouring the organic pigment solution in the aqueous medium, and a method of concurrently mixing the organic pigment solution and the aqueous medium. In this case, it is preferable to accelerate the mixing further by stirring.

Further, the mixing may also be performed using a channel. In this case, for example, the organic pigment solution and the aqueous medium are allowed to flow through a channel as a liquid flow, thereby mixing both the liquids under the condition that they are in contact. More specifically, an intended pigment dispersion can be obtained by a continuous flow method (the method of mixing a plurality of liquids in a continuous liquid flow in a channel under the condition that they are in contact), the method is different from a jet method that cannot control a contact time and a reaction time precisely. (A jet method is a method of spraying liquid droplets through nozzles to bring them into contact. See JP-A-2002-155221, U.S. Pat. No. 6,537,364, etc.). At this time, it is preferable to set both the liquids to be a laminar flow in the channel and bring them into contact with each other in the course of the laminar flow at a laminar flow interface. Any apparatus can be used as long as it has a channel capable of forming a laminar flow, and the flow path preferably has an equivalent diameter capable of forming a micro-reaction site.

The equivalent diameter is a term also called a corresponding diameter, which is used in mechanical engineering field. If a cylindrical pipe equivalent to the pipe (channel in the present invention) having any sectional shape is assumed, the diameter of the equivalent cylindrical pipe corresponds to the equivalent diameter. The equivalent diameter ($d_{eq}$) is defined as $d_{eq}=4A/p$ in which A is a sectional area of the pipe, and p is a wetted perimeter length (circumferential length) of the pipe. In the case of the cylindrical pipe, this equivalent diameter corresponds to the diameter of the cylindrical pipe. The equivalent diameter is used for presuming fluidity or heat conducting characteristic of the pipe on the basis of data of the equivalent cylindrical pipe, and expresses a spatial scale (a representative length) of a phenomenon. The equivalent diameter is: $d_{eq}=4a^2/4a=a$ in a squared pipe having a side (a); $d_{eq}=a/\sqrt{3}$ in an equilateral triangular pipe having a side (a); and $d_{eq}=2h$ in a flow between paralleled plates having a channel height (h) (see, for example, edited by Nippon Kikai Gakkai, "Kikai Kougaku Jiten," 1997, published by Maruzen, K. K.).

When causing water to flow into a pipe, inserting a narrow pipe into the pipe along the central axis thereof and then injecting a colored solution into the water, the colored solution flows in the form of a single line while the flow velocity of the water is small or slow. Thus, the water flows straightly and in parallel to the wall of the pipe. However, when the flow velocity is raised to reach a given flow velocity, turbulence is suddenly caused in the water flow. Consequently, the colored solution is mixed with the water flow so that the whole of the solution and water becomes a colored flow. The former flow is called laminar flow, and the latter flow is called turbulent flow.

Whether a flow turns to a laminar flow or turbulent flow depends on whether or not the Reynolds number, which is a dimensionless number showing the state of the flow, is not more than a given critical value. As the Reynolds number is smaller, a laminar flow is more apt to be caused. The Reynolds number Re of the flow in a pipe is represented by the following equation:

$$Re = D \langle v_x \rangle \rho / \mu$$

wherein D represents the equivalent diameter of the pipe, $\langle v_x \rangle$ represents the sectional average velocity, $\rho$ represents the density of the flow, and $\mu$ represents the viscosity of the flow. As can be understood from this equation, the Reynolds number is smaller as the equivalent diameter is smaller. Therefore, in the case that the equivalent diameter is in the order of μm, a stable laminar flow is apt to be formed. In addition, because the physical properties of the solution, such as the density and the viscosity thereof, also have influence on the Reynolds number. As the density is smaller and/or the viscosity is larger, the Reynolds number is smaller. It can be, therefore, understood that a laminar flow is apt to be formed in that case.

The Reynolds number representing such a critical value is called "critical Reynolds number". The critical Reynolds number is not necessarily definite. However, roughly, the following values can be criteria:

| | |
|---|---|
| Re < 2,300 | laminar flow; |
| Re > 3,000 | turbulent flow; and |
| 3,000 ≧ Re ≧ 2,300 | transition state. |

As the equivalent diameter of a channel is smaller, the surface area per unit volume (specific surface area) thereof is larger. When the channel turns into a micro-scale, the specific surface area becomes remarkably large so that the conduction efficiency of heat through the wall of the channel becomes very high. Since the heat conduction time (t) of a fluid flowing in the channel is represented by: $t=d_{eq}^2/\alpha$ (in which $\alpha$ is the heat diffusion rate of the fluid), the heat conduction time becomes shorter as the equivalent diameter becomes smaller. That is, if the equivalent diameter becomes 1/10, the heat conduction time becomes 1/100. Thus, when the equivalent diameter is in a micro-scale, the heat conduction speed is very high.

Precisely, in a micro-size space where the equivalent diameter is in micro-scale, flow has a small Reynolds number, and thus, a flow reaction can be conducted with the stable laminar flow being preferential. In addition, the interface between laminar flows has a very large interface surface area. This enables high-speed and precise mixing of component molecules owing to molecular diffusion between laminar flows, with keeping laminar flows. Further, use can be made of a channel wall having a large surface area, which enables precise temperature control; and controlling the flow rate in flow reaction enables precise control of reaction time. Therefore, among the channels where the laminar flow can be formed according to the present invention, a channel of micro scale that has an equivalent diameter with which the reaction can be highly controlled is defined as a micro reaction site.

As shown in the above explanation of Reynolds number, formation of laminar flow is largely influenced not only by the size of equivalent diameter of the channel but also by flowing conditions that include solution physical properties such as viscosity and density. Therefore, in the present invention, the equivalent diameter of the channel is not particularly limited as long as a laminar flow is formed in the channel. The equivalent diameter is preferably of a size with which a laminar flow easily forms. The equivalent diameter of the channel is preferably 10 mm or less, and it is more preferably 1 mm or less since a micro reaction site can be formed. The equivalent diameter is further preferably 10 µm to 1 mm, and particularly preferably 20 to 300 µm.

A typical example of the reaction apparatus having such a micro-scale size flow path (channel), which can be preferably used in a method of the present invention, is commonly called "microreactor" and is being developed greatly in recent years (see, for example, W. Ehrfeld, V. Hessel, and H. Loewe, "Microreactor," 1 Ed. (2000) Wiley-VCH).

The above-mentioned general micro-reactor is provided with plural micro-channels each having an equivalent diameter (obtained by converting the section thereof to a corresponding circle) of several micrometers to several hundred micrometers; and a mixing space connected to these micro-channels. In the micro-reactor, plural solutions are introduced through the plural micro-channels into the mixing space, thereby mixing the solutions, or mixing the solutions and simultaneously causing chemical reaction.

Next, the following describes major different points of reaction by use of the micro-reactor from reaction based on a batch type by use of a tank or the like. In chemical reaction of a liquid phase and chemical reaction in two liquid phases, molecules generally encounter each other on the interface between the reaction solutions, to cause the reaction. Therefore, when the reaction is conducted in a microscopic space (micro-channel), the area of the interface becomes large in relation to the space so that the efficiency of the reaction increases remarkably. In addition, about the diffusion of molecules, the diffusion time is in proportion with the square of diffusion distance. This fact means that as the scale is made smaller, the mixing of the reaction solutions advances more by the diffusion of the molecules, so as to cause the reaction more easily even if the reaction solutions are not actively mixed. Further, in the microscopic space, flows have small Reynolds numbers (dimensionless number by which the flow is characterized), the flows tend to turn preferentially to laminar flows. Therefore, the molecules existent in the solutions are exchanged from one laminar flow to another laminar flow on the interface where the solutions are in the states of laminar flows, and the transferred molecules cause precipitation or reaction.

When a micro-reactor, which has characteristics as described above, is used, the reaction time and temperature between the solutions therein can be more precisely controlled, compared with a conventional batch system, in which, for example, a tank having a large volume is used as a reaction site. Further, in the batch system, in particular, between solutions having a large reaction speed, sometimes reaction advances on a reaction contact face generated at the initial stage of mixing the solutions, and further a primary product generated by the reaction between the solutions subsequently undergoes reaction in the container. Therefore, there may be a possibility that the resultant product becomes non-homogeneous or crystals of the product grow beyond necessity in the mixing container (batch) to get coarse. Contrary to the above, according to a micro-reactor that can be used in the present invention, solutions hardly remain in the mixing space (e.g. a mixing container) so as to flow continuously. Consequently, it is possible to restrain a primary product generated by the reaction between the solutions from undergoing subsequent reaction while the primary product remains in the mixing space. Thus, a pure primary product, which has been hardly taken out hitherto, can be taken out. Moreover, it becomes difficult that crystals aggregate in the mixing space or get coarse.

Further, when a chemical substance that can be produced in only a small amount by use of an experimental producing-apparatus, is tried to produce in a large amount by use of large-scale manufacturing facilities (i.e. scaling up), huge labor and very long period of time have been required hitherto, to gain the reproducibility of the manufacture in large-scale manufacturing facilities of a batch system as similar as the reproducibility of the production in the experimental producing-apparatus. However, by arranging a plurality of producing lines each using a micro-reactor in parallel (numbering-up) according to a necessary production quantity, labor and time period for gaining such the reproducibility may be largely reduced.

Hereinafter preferable examples of the method for forming the channel that can be used in a method of the present invention will be explained, but the present invention is not limited by the explanation. It is relatively easy to form a channel with an equivalent diameter of 1 mm or more with generally known machine processing techniques, but it is exceptionally difficult to form a channel with a size of 1 mm or less (micro size), especially with a size of 500 µm or less. A micro-size channel (micro-channel) is formed on a solid substrate by micro processing technique in many cases. The material of the substrate may be any stable material that is not apt to be corroded. Examples of the material include metal (e.g. stainless steel, hastelloy (Ni—Fe based alloy), nickel, aluminum, silver, gold, platinum, tantalum, and titanium), glass, plastics, silicone, Teflon (registered trademark), and ceramics.

Representative examples of the micro processing technique for producing the micro-channel include a LIGA (Roentgen-Lithographie Galvanik Abformung) method using X-ray lithography, a high aspect ratio photolithography method using EPON SU-8 (trade name), a micro discharge processing method (µ-EDM (Micro Electro Discharge Machining)), a high aspect ratio processing method for silicon by Deep RIE (Reactive Ion Etching), a hot emboss processing method, a photo-fabrication method, a laser processing method, an ion beam processing method, and a mechanical micro cutting processing method using a micro tool made of such a hard material as diamond. These techniques may be used alone or in combination. Preferable micro processing techniques are the LIGA method using X-ray lithography, the high-aspect ratio photolithography method using EPON SU-8, the micro discharge processing method (µ-EDM), and the mechanical micro cutting processing method. In recent years, investigations have been made for applying a micro-injection molding technique to engineering plastics.

When the micro channel is assembled, a joining technique is often used. A normal joining technique is roughly divided into solid-phase joining and liquid-phase joining. In joining methods generally used, a typical joining method includes pressure welding and diffusion bonding as the solid-phase joining; and welding, eutectic bonding, soldering, and gluing as the liquid joining. Further, at the time of assembling, it is desirable to use a highly precise joining method in which dimension accuracy is maintained in such a way that deterioration of material due to high temperature heating, or destruction of a micro-structure such as a flow passage by a large deformation of material does not take place. Such a technique includes a silicon direct joining, anode joining, surface activation joining, direct joining using hydrogen bond, joining using aqueous HF solution, Au—Si eutectic bonding, and void-free bonding.

The micro-channels that can be used in the producing method of the present invention are not limited to channels formed on a solid substrate by use of the micro processing technique, and may be, for example, various available fused silica capillary tubes each having an inner diameter of several micrometers to several hundred micrometers. Various silicon tubes, fluorine-containing resin tubes, stainless steel pipes, and PEEK (polyetheretherketone) pipes each having an inner diameter of several micrometers to several hundred micrometers, which are commercially available as parts for high-performance liquid chromatography or gas chromatography, can also be used.

Hitherto, with respect to micro-reactors, devices that are aimed to improve reaction efficiency and the like, have been reported. For example, JP-A-2003-210960, JP-A-2003-210963, JP-A-2003-210959, JP-A-2005-46650, JP-A-2005-46651, JP-A-2005-46652, and JP-A-2005-288254 are concerned with micro-mixers and micro-reactors. In the present invention, these micro-devices may also be used.

The micro-channel that can be used in the present invention may be subjected to a surface treatment. In particular, when handling an aqueous solution, since the adsorption of a sample to glass or silicon may become a problem, the surface treatment is important. In the fluid control in the micro-sized flow passage, it is desirable to realize this without incorporating a movable part requiring a complicated manufacturing process. For example, when a hydrophilic region and a hydrophobic region are prepared in the channel by the surface treatment, it becomes possible to treat a fluid by using a difference in surface tension exerting on the boundary between these regions. The method used for surface-treating glass or silicon in many cases may be hydrophobic or hydrophilic surface-treatment by using a silane coupling agent.

In order to introduce a reagent, sample, or the like into the channels and mix, a fluid control function may be needed. Specifically, since the behavior of the fluid in the micro channel has properties different from those of a macro-scale, a control method appropriate for the micro-scale should preferably be considered. A fluid control method is classified into a continuous flow system and a droplet (liquid plug) system according to the formation, while it is also classified into an electric driving system and a pressure driving system according to the driving force.

A more detailed description of these systems will be given hereinafter. The most widely used system as a formation for treating a fluid is the continuous flow system. When the flow is controlled in the continuous flow system, generally, the entire portion inside the micro-channel is filled with a fluid, and the fluid as a whole is driven by a pressure source such as a syringe pump that is provided outside the channel. In this method, although there is such a difficulty that dead volume is large, and the like, the continuous flow system has such a great merit that the control system can be realized with a relatively simple set-up.

As a system which is different from the continuous flow system, there is provided the droplet (liquid plug) system. In this system, droplets partitioned by air are made to move inside the reactor or inside the channel leading to the reactor, and each of the droplets is driven by air pressure. During this process, a vent structure for allowing air between droplets and channel walls, or air between the droplets as necessary, to escape to the outside; a valve structure for maintaining pressure inside the branched channels independently from pressure at other portions; and the like, must be provided inside the reactor system. Further, a pressure control system comprising a pressure source or a switching valve must be provided outside the reactor system in order to move the droplets by controlling the pressure difference. Thus, in the droplet system, although the apparatus configuration and the structure of the reactor become rather complicated as stated above, a multi-stage operation is enabled, for example, plural droplets are individually operated and some reactions are sequentially performed, and the degree of freedom concerning the system configuration becomes high.

As the driving system for performing the fluid control, there are generally and widely used an electrical driving method in which a high voltage is applied between both ends of a flow passage (channel) to generate an electro-osmotic flow, thereby fluid is moved; and a pressure driving method in which a pressure is applied to a fluid from the outside of the passage using a pressure source to move the fluid. It has been known that both systems are different in that, for example, as the behavior of the fluid, the flow velocity profile in the cross-section of the flow passage becomes a flat distribution in the case of the electrical driving system, whereas it becomes a hyperbolic flow distribution in the pressure driving system, in which the flow velocity is high at the center of the flow passage and low at the wall surface part. Therefore, the electrical driving system is suitable for such an object that a movement is made while the shape of a sample plug or the like is kept. In the case where the electrical driving system is performed, since it is necessary that the inside of the flow passage is filled with the fluid, the form of the continuous flow system must be adopted. However, since the fluid can be treated by an electrical control, a comparatively complicated process is also realized, for example, a concentration gradient varying with time is formed by continuously changing the mixing ratio of two kinds of solutions. In the case of the pressure driving system, the control can be made irrespective of electrical properties of the fluid, and secondary effects such as heat generation or electrolysis may not be considered, and therefore, an influence on the substrate (component) hardly exists, and its application range is wide. On the contrary, a pressure source must be prepared outside, and for example, response characteristics to manipulation are changed according to the magnitude of a dead volume of a pressure system, and it is necessary to automate the complicated process.

Although a method to be used as a fluid control method can suitably be selected, the pressure driving system of the continuous flow system is preferable.

The temperature control in the channel may be performed by putting the whole device having a passage in a container in which the temperature is controlled; or forming a heater structure such as a metal resistance wire or polysilicon in the device, and performing a thermal cycle in such a manner that the heater structure is used when heating, and cooling is natural cooling. With respect to the sensing of temperature, when a metal resistance wire is used, it is preferable that the same resistance wire as the heater is additionally formed, and the temperature detection is performed on the basis of the change of the resistance value of the additional wire. When the polysilicon is used, it is preferable that a thermocouple is used to detect the temperature. Further, heating and cooling may be performed from the outside by bringing a Peltier element into contact with the channel. A suitable method can be selected in accordance with the use, the material of the channel body, and the like.

In the case of precipitating fine particles in the course of flowing through a channel, the reaction time can be controlled with a time during which they remain in the channel. When the equivalent diameter is constant, the retention time can be determined by the length of the channel and the induction speeds of the reaction solutions. Further, the length of the channel is not particularly limited, but it is preferably 1 mm or more but 10 m or less, more preferably 5 mm or more but 10 m or less, and particularly preferably 10 mm or more but 5 m or less.

In a method of the present invention, the number of channels may be any number appropriately provided with a reactor. The number of channels may be one. Alternately, many channels may be arranged in parallel (i.e. numbering-up) as needed, to increase a processing amount thereof.

Preferred examples of a reactor that can be used in a method of the present invention are illustrated in FIGS. 1-1 to 8. Needless to say, the present invention is not limited to these examples.

Figures 1, 2:
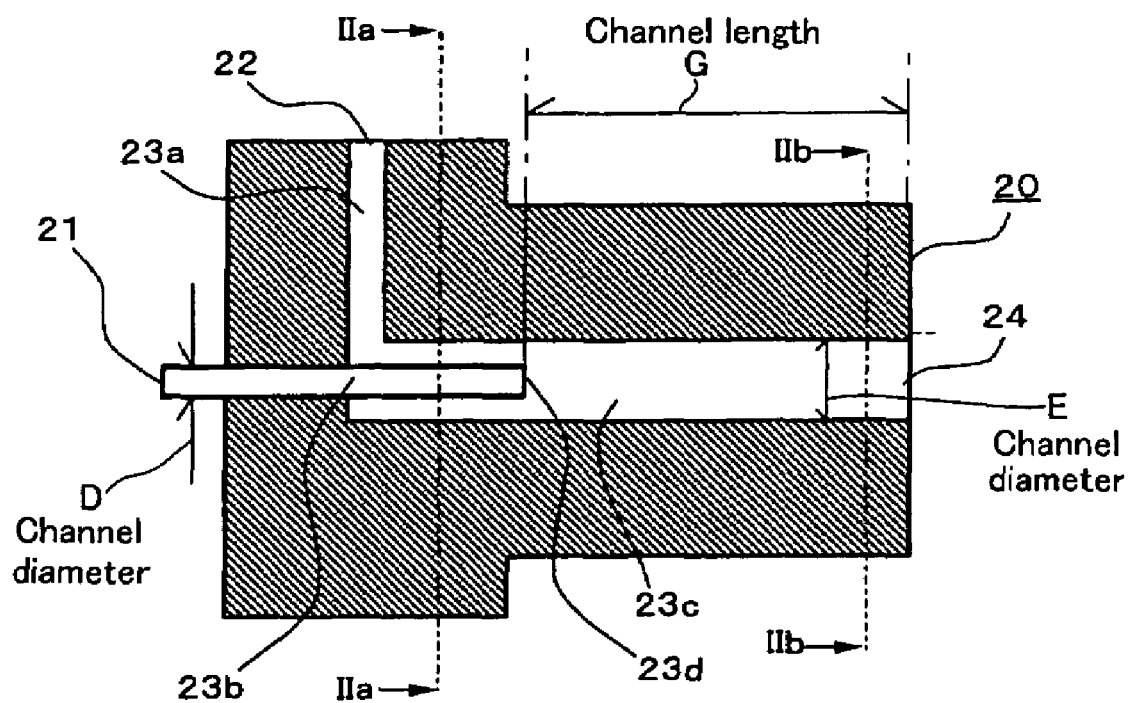
Figure 2:
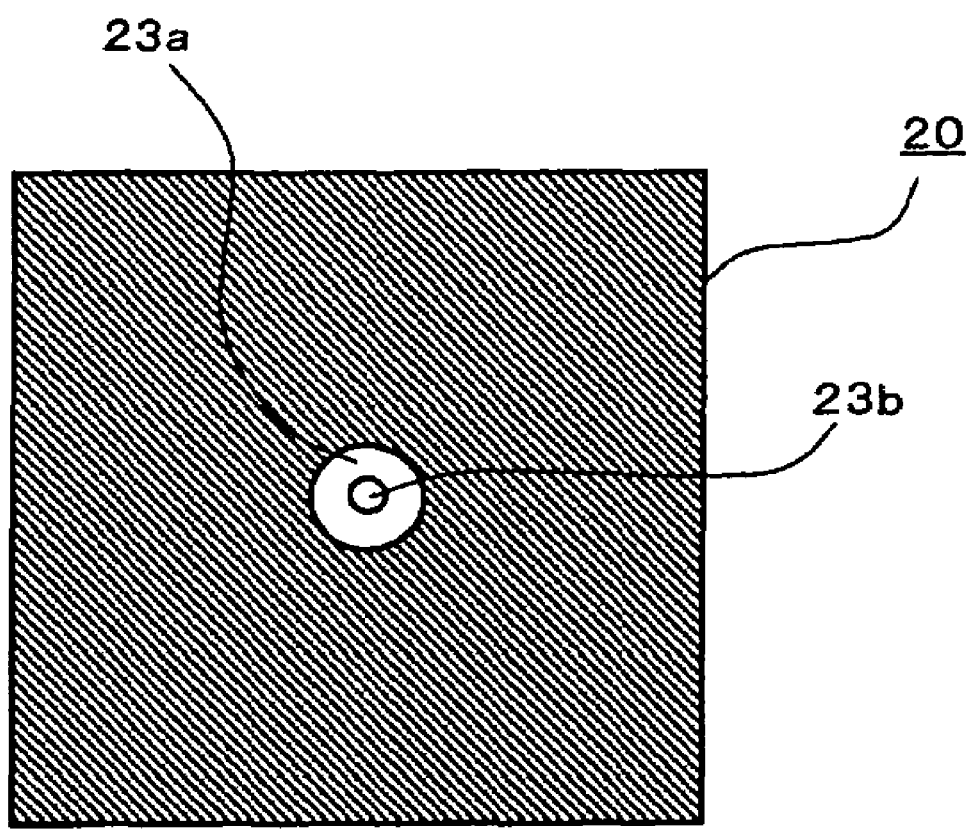

FIG. 1-1 is an explanatory view of one embodiment of a reactor (10) having a Y-shaped channel. FIG. 1-2 is a sectional view taken on I-I line of FIG. 1-1. The shape of the section perpendicular to the direction of the length of the channel is varied dependently on the micro processing technique to be used, and is a shape close to a trapezoid or a rectangle. When widths and depths (in particular, width C and depth H) of the Y-shaped channel are made into micro-sizes, solutions introduced from introducing ports 11 and 12 with pumps or the like are caused to flow via introducing channels 13a or 13b, respectively, and are brought into contact with each other at a fluid confluence points 13d to form stable laminar flows to flow through a reaction channel 13c. While the solutions flow as the laminar flows, a solute contained in a laminar flow is mixed or reacted with another solute contained in another laminar flow each other by molecular diffusion on the interface between the laminar flows. Solutes, which diffuse very slowly, may not be diffused or mixed between the laminar flows; and, in some cases, the solutes are not mixed until they reach a discharge port 14. In such a case that the two solutions to be introduced are easily mixed in a flask, the flow of the mixed solutions may become homogeneous flow in the discharge port if a channel length F is made long. However, when the channel length F is short, laminar flows are kept up to the discharge port. When the two solutions to be introduced are not mixed in a flask and are separated into phases, the two solutions naturally flow as laminar flows to reach the discharge port 14.

Figures 2, 3:
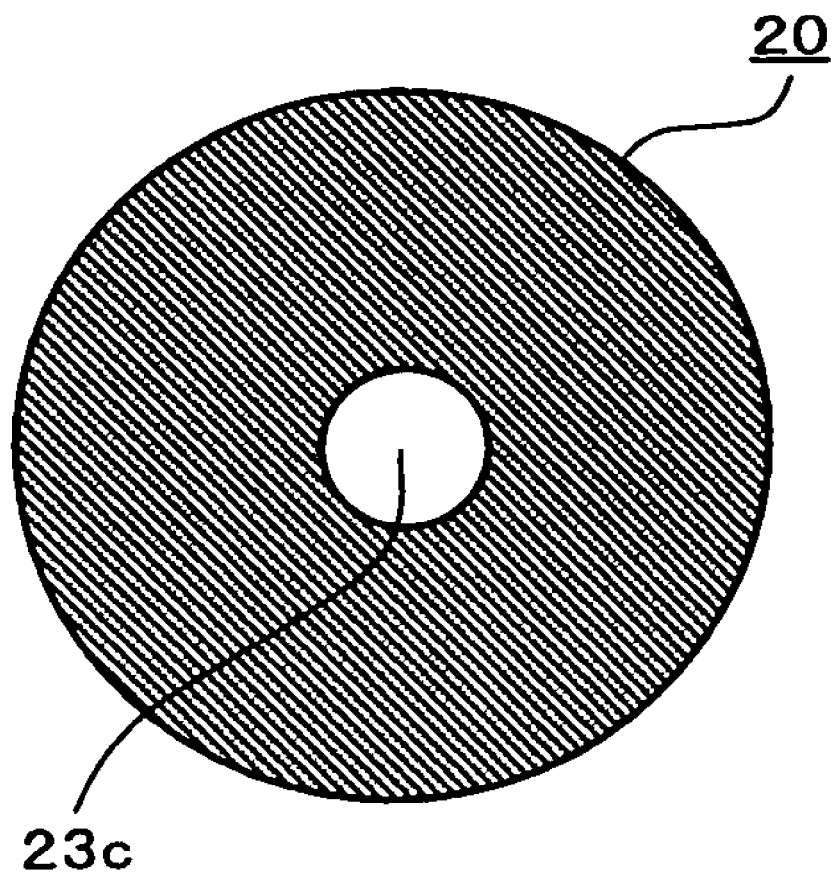

FIG. 2-1 is an explanatory view of one embodiment of a reactor (20) having a cylindrical pipe-type channel in which a channel is inserted at one side thereof. FIG. 2-2 is a sectional view of the reactor taken on line IIa-IIa of FIG. 2-1, and FIG. 2-3 is a sectional view of the reactor taken on line IIb-IIb of FIG. 2-1. The shape of the section perpendicular to the direction of the length of the channel is a circular shape or a shape close thereto. When the channel diameters (D and E) of the cylindrical pipes are micro-sizes, solutions introduced from introducing ports 21 and 22 with pumps or the like are caused to flow via introducing channels 23b or 23a, respectively, and are brought into contact with each other at a fluid confluence point 23d to form stable cylindrical laminar flows to flow through a reaction channel 23c. While the solutions flow as the cylindrical laminar flows, solutes contained in the separate laminar flows are mixed or reacted with each other by molecular diffusion on the interface between the laminar flows. This matter is the same as in the case of the reactor, as illustrated in FIG. 1-1. The apparatus having the cylindrical pipe-type channel has the following characteristics: that the apparatus can make the contact interface between the two solutions larger than the apparatus illustrated in FIG. 1-1; and since the contact interface has no portion to contact the wall face of the apparatus, it does not happen that crystal growth is caused from the contact portion with the wall face as in the case that a solid (crystal) is generated by reaction, thereby the apparatus gives only a low possibility that the channel is clogged.

Figure 4:
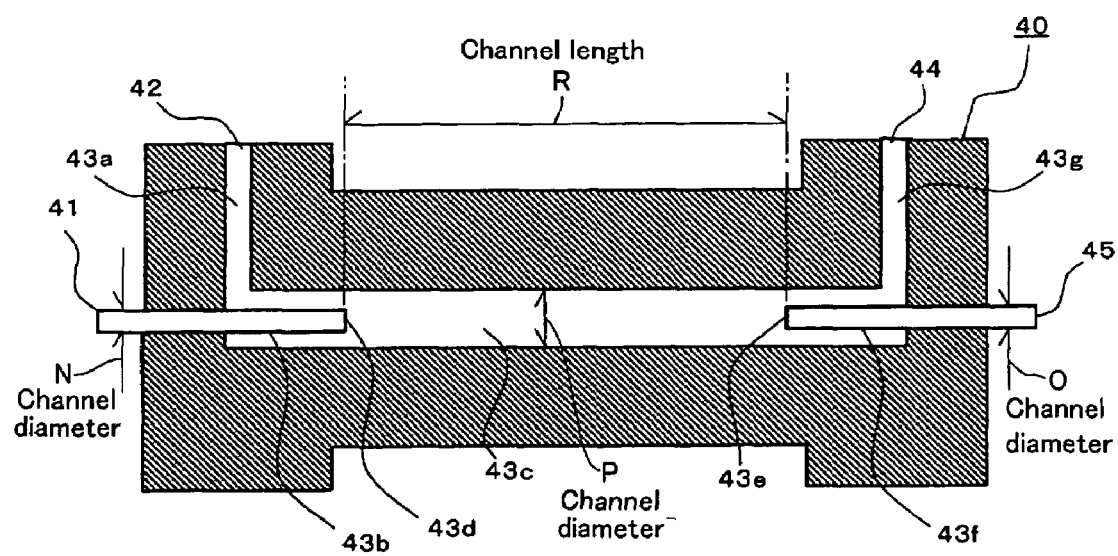
FIG. 4 is an explanatory view of one embodiment of a reactor for use in a method of the present invention, the reactor which has a cylindrical tube-type channel in which channels are provided to insert at both sides thereof.

FIGS. 3-1 and 4 illustrate apparatuses obtained by improving the apparatuses illustrated in FIGS. 1-1 and 2-1, respectively, in order that when flows of two solutions arrive at outlets in the state that the flows are laminar flows, the laminar flows can be separated. When these apparatuses are used, reaction and separation can be attained at the same time. It is also possible to avoid phenomena that the two solutions are finally mixed so that the reaction between the solutions advances excessively, and that generated crystals get coarse. In the case that products or crystals are selectively present in one of the solutions, the products or crystals can be obtained with a higher concentration than in the case that the two solutions are mixed. Further, by linking a plurality of the apparatuses to each other, there are such advantages that an extracting operation is effectively performed.

Figure 5:
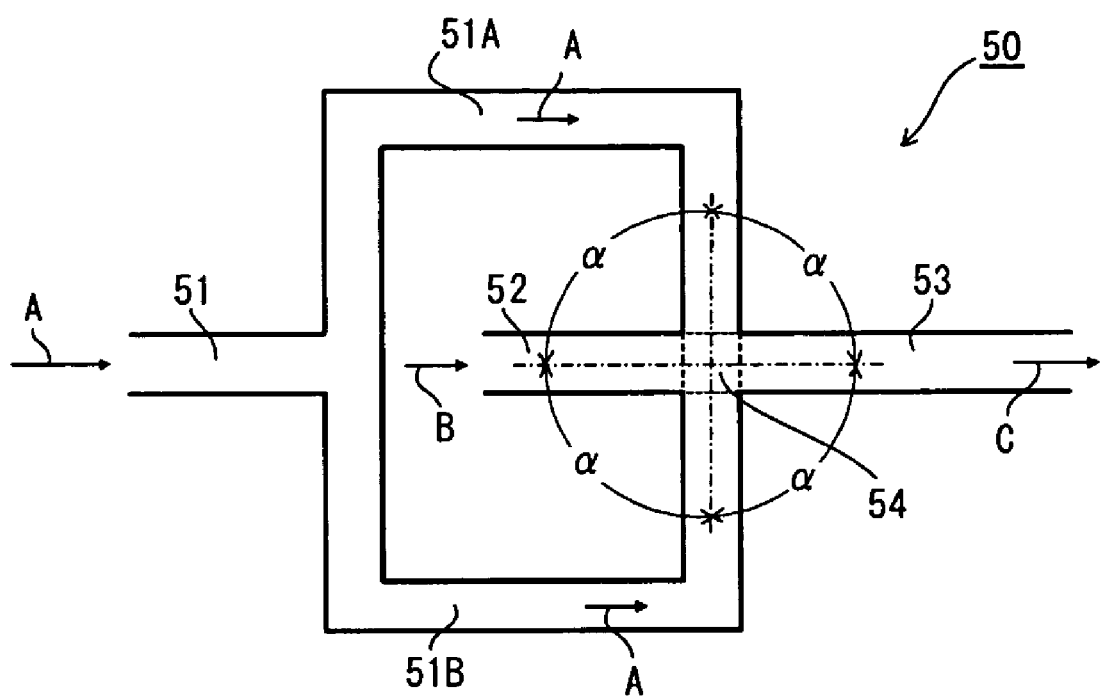
FIG. 5 is an explanatory view illustrating one embodiment of a plane-type micro-reactor for use in a method of the present invention.

A micro-reactor 50 shown in FIG. 5 is configured in such a manner that two divided supply flow paths 51A, 51B that are divided from one supply flow path 51 for supplying a solution A so as to divide the solution A into two, one supply flow path 52 for supplying a solution B, which is not divided, and a micro-flow path 53 for effecting a reaction between the solutions A and B are communicated with each other in one combined region 54. Further, the divided supply flow paths 51A, 51B, the supply flow path 52, and the micro-flow path 53 are placed with an equal interval at 90° around the combined region 54 substantially in an identical plane. More specifically, center axes (alternate long and short dash lines) of the respective flow paths 51A, 51B, 52, and 53 cross each other in a cross shape (cross angle α=90°) in the combined region 54. In FIG. 5, although only the supply flow path 51 of the solution A whose supply amount is larger than that of the solution B is divided, the supply flow path 52 of the solution B may also be divided into a plurality of paths. Further, the cross angle α of the respective flow paths 51A, 51B, 52, and 53 placed around the combined region 54 is not limited to 90°, and can be set appropriately. Further, the number of division of the supply flow paths 51, 52 is not particularly limited. However, when the number of division is too large, the configuration of the micro-reactor 50 becomes complicated. Therefore, the number of division is preferably 2 to 10, and more preferably 2 to 5.

Figure 6:
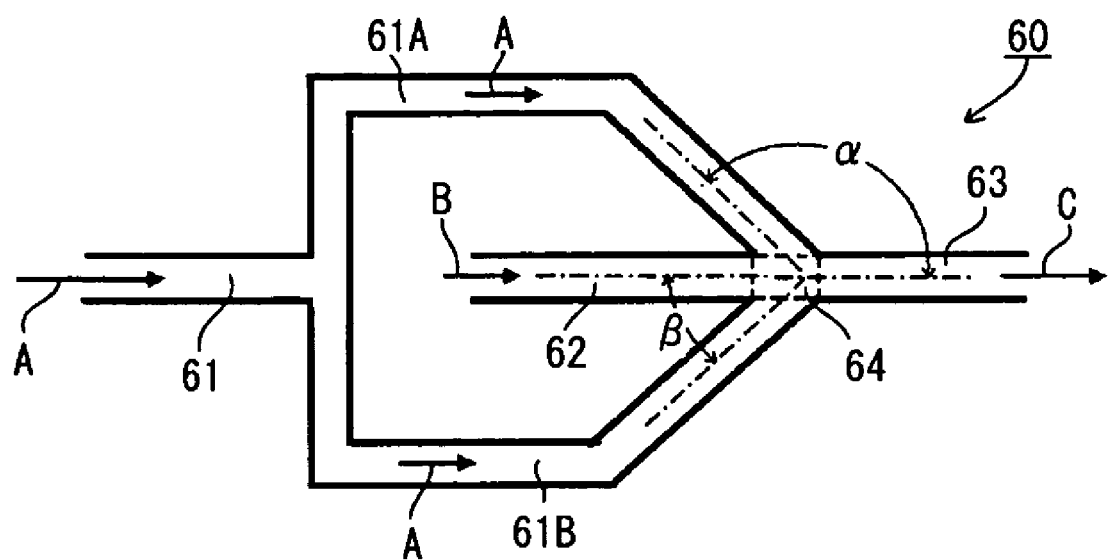
FIG. 6 is an explanatory view illustrating another embodiment of a plane-type micro-reactor for use in a method of the present invention.

FIG. 6 is an explanatory view illustrating another embodiment of the plane-type microreactor 50 of FIG. 5. In a microreactor 60, a cross angle β formed by center axes of divided supply flow paths 61A, 61B with respect to a center axis of a supply flow path 62 is smaller than 90° of FIG. 5 and is 45°. Further, the microreactor 60 is configured so that a cross angle α formed by a center axis of a micro-flow path 63 with respect to the center axes of the divided supply flow paths 61A, 61B is 135°.

Figure 7:
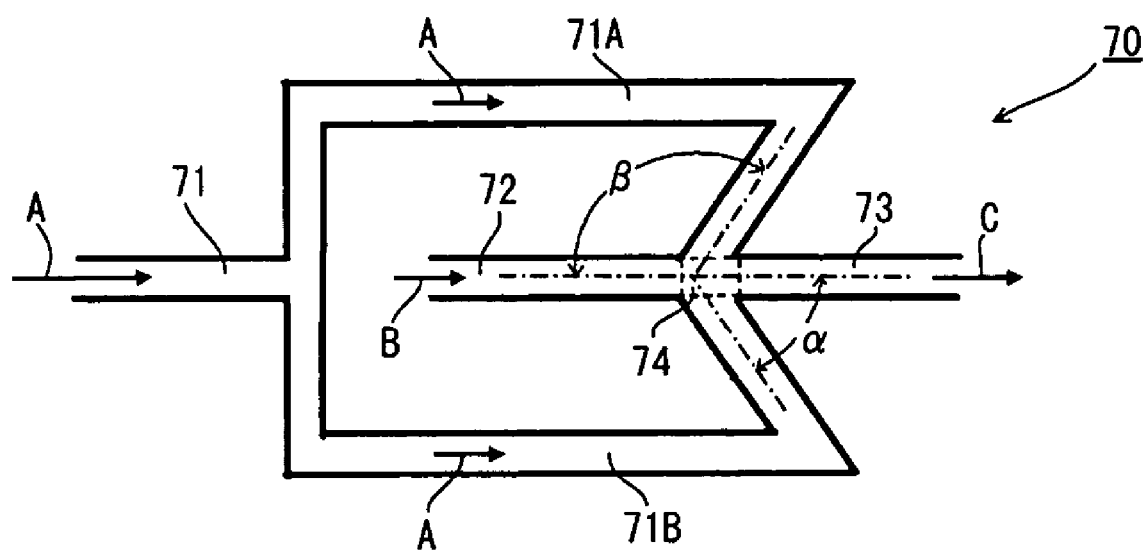
FIG. 7 is a view illustrating still another embodiment of a plane-type micro-reactor for use in a method of the present invention.

FIG. 7 is an explanatory view illustrating still another embodiment of the plane-type microreactor of FIG. 5. In a microreactor 70, a cross angle β formed by center axes of divided supply flow paths 71A, 71B through which the solution A flows with respect to a center axis of the supply flow path 72 through which a solution B flows is larger than 90° of FIG. 5 and is 135°. Further, the microreactor 70 is configured so that a cross angle α formed by a center axis of a micro-flow path 73 with respect to the center axes of the divided supply flow paths 71A, 71B becomes 45°. The cross angles α, β of the supply flow path 72, the divided supply flow paths 71A, 71B, and the micro-flow path 73 can be set appropriately.

However, assuming that the sum of cross-sections in a thickness direction of the combined solutions B and A is S1, and the cross-section in a diameter direction of the micro-flow path 73 is S2, it is preferable to set the cross angles α, β so as to satisfy S1>S2. This can further increase the contact area between the solutions A, B, and further decrease the diffusion/mixing distance thereof, so that the mixing becomes likely to occur more instantaneously.

FIG. 8 is an exploded perspective view showing an example of a three-dimensional microreactor 80 under the condition that three parts constituting the microreactor 80 are decomposed. The three-dimensional microreactor 80 is mainly composed of a supply block 81, a combination block 82, and a reaction block 83, each having a cylindrical shape. For assembling the microreactor 80, the side faces of the blocks 81, 82, 83 having a cylindrical shape are attached to each other in this order to form a cylinder, and in this state, the respective blocks 81, 82, 83 are fastened integrally with a boltnut, etc.

On a side face 84 of the supply block 81 opposed to the combination block 82, two annular grooves 86, 85 are formed concentrically, and in the assembled state of the microreactor 80, two annular grooves 86, 85 form ring-shaped flow paths through which the solutions B and A flow respectively. Then, through-holes 88, 87 are respectively formed so as to reach the outside annular groove 86 and the inside annular groove 85 from a side face 94 of the supply block 81 not opposed to the combination block 82. Among two through-holes 88, 87, supply means (a pump, a connecting tube, etc.) for supplying the solution A is connected to the through-hole 88 communicated with the outside annular groove 86, and supply means (a pump, a connecting tube, etc.) for supplying the solution B is connected to the through-hole 87 communicated with the inside annular groove 85. In FIG. 8, although the solution A is allowed to flow through the outside annular groove 86, and the solution B is allowed to flow through the inside annular groove 85, they may be opposite.

At a center of a side face 89 of the combination block 82 opposed to the reaction block 83, a circular combination hole 90 is formed, and four long radial grooves 91, 91 . . . and four short radial grooves 92, 92 . . . are formed alternately in a radial manner from the combination hole 90. In the assembled state of the microreactor 80, the combination hole 90 and the radial grooves 91, 92 form a circular space to be a combination region 90 and radial flow paths through which the solutions A, B flow. Further, through-holes 95, 95 . . . are respectively formed in a thickness direction of the combination block 82 from the tip ends of the long radial grooves 91 among eight radial grooves 91, 92, and these through-holes 95 are communicated with the above-mentioned outside annular groove 86 formed in the supply block 81. Similarly, through-holes 96, 96 . . . are respective formed in a thickness direction of the combination block 82 from the tip ends of the short radial grooves 92, and the through-holes 96 are communicated with the inside annular groove 85 formed in the supply block 81.

Further, at a center of the reaction block 83, one through-hole 93 communicated with the combination hole 90 is formed in a thickness direction of the reaction block 83, and the through-hole 93 becomes a micro-flow path.

Because of this, the solution A flows through a supply flow path composed of the through-hole of the supply block 81, the outside annular groove 86, the through-holes 95 of the combination block 82, and the long radial grooves 91, and divided into four divided flows to reach the combination region (combination hole 90). On the other hand, the solution B flows through a supply flow path composed of the through-hole 87 of the supply block 81, the inside annular groove 85, the through-holes 96 of the combination block 82, and the short radial grooves 92, and divided into four divided flows to reach the combination region (combination hole 90). In the combination region, the divided flow of the solution A and the divided flow of the solution B are combined with having the respective kinetic energy, and thereafter, flows in the micro-flow path with the flow direction changed by 90°.

An organic pigment that can be used in a method of the present invention is not limited in the color tone thereof, and it may be a magenta pigment, a yellow pigment, or a cyan pigment. Specifically, the organic pigment may be a magenta pigment, a yellow pigment or a cyan pigment of a perylene, perynone, quinacridone, quinacridonequinone, anthraquinone, anthanthrone, benzimidazolone, condensed disazo, disazo, azo, indanthrone, phthalocyanine, triaryl carbonium, dioxazine, aminoanthraquinone, diketopyrrolopyrrole, thioindigo, isoindoline, isoindolinone, pyranthrone or isoviolanthrone-compound pigment, or a mixture thereof.

More specifically, examples of the organic pigment include perylene-compound pigments, such as C.I. Pigment Red 190 (C.I. No. 71140), C.I. Pigment Red 224 (C.I. No. 71127), and C.I. Pigment Violet 29 (C.I. No. 71129); perynone-compound pigments, such as C.I. Pigment Orange 43 (C.I. No. 71105), and C.I. Pigment Red 194 (C.I. No. 71100); quinacridone-compound pigments, such as C.I. Pigment Violet 19 (C.I. No. 73900), C.I. Pigment Violet 42, C.I. Pigment Red 122 (C.I. No. 73915), C.I. Pigment Red 192, C.I. Pigment Red 202 (C.I. No. 73907), C.I. Pigment Red 207 (C.I. Nos. 73900 and 73906), and C.I. Pigment Red 209 (C.I. No. 73905); quinacridonequinone-compound pigments, such as C.I. Pigment Red 206 (C.I. No. 73900/73920), C.I. Pigment Orange 48 (C.I. No. 73900/73920), and C.I. Pigment Orange 49 (C.I. No. 73900/73920); anthraquinone-compound pigments, such as C.I. Pigment Yellow 147 (C.I. No. 60645); anthanthrone-compound pigments, such as C.I. Pigment Red 168 (C.I. No. 59300); benzimidazolone-compound pigments, such as C.I. Pigment Brown 25 (C.I. No. 12510), C.I. Pigment Violet 32 (C.I. No. 12517), C.I. Pigment Yellow 180 (C.I. No. 21290), C.I. Pigment Yellow 181 (C.I. No. 11777), C.I. Pigment Orange 62 (C.I. No. 11775), and C.I. Pigment Red 185 (C.I. No. 12516); condensed disazo-compound pigments, such as C.I. Pigment Yellow 93 (C.I. No. 20710), C.I. Pigment Yellow 94 (C.I. No. 20038), C.I. Pigment Yellow 95 (C.I. No. 20034), C.I. Pigment Yellow 128 (C.I. No. 20037), C.I. Pigment Yellow 166 (C.I. No. 20035), C.I. Pigment Orange 34 (C.I. No. 21115), C.I. Pigment Orange 13 (C.I. No. 21110), C.I. Pigment Orange 31 (C.I. No. 20050), C.I. Pigment Red 144 (C.I. No. 20735), C.I. Pigment Red 166 (C.I. No. 20730), C.I. Pigment Red 220 (C.I. No. 20055), C.I. Pigment Red 221 (C.I. No. 20065), C.I. Pigment Red 242 (C.I. No. 20067), C.I. Pigment Red 248, C.I. Pigment Red 262, and C.I. Pigment Brown 23 (C.I. No. 20060); disazo-compound pigments, such as C.I. Pigment Yellow 13 (C.I. No. 21100), C.I. Pigment Yellow 83 (C.I. No. 21108), and C.I. Pigment Yellow 188 (C.I. No. 21094); azo-compound pigments, such as C.I. Pigment Red 187 (C.I. No. 12486), C.I. Pigment Red 170 (C.I. No. 12475), C.I. Pigment Yellow 74 (C.I. No. 11714), C.I. Pigment Red 48 (C.I. No. 15865), C.I. Pigment Red 53 (C.I. No. 15585), C.I. Pigment Orange 64 (C.I. No. 12760), and C.I. Pigment Red 247 (C.I. No. 15915); indanthrone-compound pigments, such as C.I. Pigment Blue 60 (C.I. No. 69800); phthalocyanine-compound pigments, such as C.I. Pigment Green 7 (C.I. No. 74260), C.I. Pigment Green 36 (C.I. No. 74265), Pigment Green 37 (C.I. No. 74255), Pigment Blue 16 (C.I. No. 74100), C.I. Pigment Blue 75 (C.I. No. 74160:2), and 15 (C.I. No. 74160); triaryl carbonium-compound pigments, such as C.I. Pigment Blue 56 (C.I. No. 42800), and C.I. Pigment Blue 61 (C.I. No. 42765:1); dioxazine-compound pigments, such as C.I. Pigment Violet 23 (C.I. No. 51319), and C.I. Pigment Violet 37 (C.I. No. 51345); aminoanthraquinone-compound pigments, such as C.I. Pigment Red 177 (C.I. No. 65300); diketopyrrolopyrrole-compound pigments, such as C.I. Pigment Red 254 (C.I. No. 56110), C.I. Pigment Red 255 (C.I. No. 561050), C.I. Pigment Red 264, C.I. Pigment Red 272 (C.I. No. 561150), C.I. Pigment Orange 71, and C.I. Pigment Orange 73; thioindigo-compound pigments, such as C.I. Pigment Red 88 (C.I. No. 73312); isoindoline-compound pigments, such as C.I. Pigment Yellow 139 (C.I. No. 56298), C.I. Pigment Orange 66 (C.I. No. 48210); isoindolinone-compound pigments, such as C.I. Pigment Yellow 109 (C.I. No. 56284), and C.I. Pigment Orange 61 (C.I. No. 11295); pyranthrone-compound pigments, such as C.I. Pigment Orange 40 (C.I. No. 59700), and C.I. Pigment Red 216 (C.I. No. 59710); and isoviolanthrone-compound pigments, such as C.I. Pigment Violet 31 (C.I. No. 60010).

Preferred pigments are quinacridone-, diketopyrrolopyrrole-, condensed disazo-, or phthalocyanine-compound pigments; and particularly preferred pigments are quinacridone-, condensed disazo-, or phthalocyanine-compound pigments.

One kind or at least two kinds of organic solvent may be used in a method of producing an organic pigment dispersion liquid of the present invention, and further, a solid solution or a combination of an organic pigment and an inorganic pigment may be used.

The organic pigment solution used in a method of the present invention is preferably obtained by uniformly dissolving an organic pigment, and the method thereof is not particularly limited. An organic pigment may be dissolved in a solvent without any additive, may be dissolved using an alkaline or acidic aqueous medium, or may be dissolved with an alkaline or acidic additive or the like added separately from an aqueous medium. It depends on the nature of the pigment whether the organic pigment in interest may be more easily dissolved homogeneously under either alkaline or acidic, to select the conditions in which the organic pigment be dissolved under alkaline or dissolved under acidic. In general, in the case of the pigment having in the molecule thereof a group dissociative under alkaline, the alkaline medium is used, and in the case of the pigment having no group dissociative under alkaline and having in the molecule thereof many nitrogen atoms, to which protons easily adhere, the acidic medium is used. For example, quinacridone-, diketopyrrolopyrrole-, and condensed disazo-compound pigments can be dissolved in the alkaline medium, and a phthalocyanine-compound pigment can be dissolved in the acidic medium.

Examples of a base that can be used in the case that the pigment is dissolved in alkaline medium, include inorganic bases, such as sodium hydroxide, potassium hydroxide, calcium hydroxide, and barium hydroxide; and organic bases, such as trialkylamine, diazabicycloundecene (DBU), and metal alkoxides ($NaOCH_3$, $KOC_2H_5$). Among these, the inorganic bases are preferable.

The amount of the base to be used is not particularly limited, as long as the base in the amount can make the pigment be dissolved homogeneously. In the case of the inorganic base, the amount thereof is preferably from 1.0 to 30 mole equivalents, more preferably from 2.0 to 25 mole equivalents, and further preferably from 3.0 to 20 mole equivalents, to the pigment. In the case of the organic base, the amount thereof is preferably from 1.0 to 100 mole equivalents, more preferably from 5.0 to 100 mole equivalents, and further preferably from 20 to 100 mole equivalents, to the pigment.

Examples of an acid to be used in the case that the pigment is dissolved in the acidic medium, include inorganic acids, such as sulfuric acid, hydrochloric acid, and phosphoric acid; and organic acids, such as acetic acid, trifluoroacetic acid, oxalic acid, methanesulfonic acid, and trifluoromethanesulfonic acid. Among these, the inorganic acids are preferable, and sulfuric acid is especially preferable.

The amount of the acid to be used is not particularly limited, as long as the acid in the amount can make the pigment be dissolved homogeneously. In many cases, the acid is used in a larger or more excessive amount than the base. Regardless the kind of the acid being an inorganic acid or an organic acid, the amount of the acid to be used is preferably from 3 to 500 mole equivalents, more preferably from 10 to 500 mole equivalents, and further preferably from 30 to 200 mole equivalents, to the pigment.

Next, the aqueous medium will be described. In the present invention, the aqueous medium refers to water alone or a mixed solvent of an organic solvent soluble in water. The organic solvent is preferably used, for example, in the case where only water is not sufficient for uniformly dissolving a pigment and a dispersant, the case where only water is not sufficient for obtaining viscosity required for the flow through a flow path, the case where the organic solvent is required for forming a laminar flow, and the like. In most cases, owing to the addition of a water-soluble organic solvent, an organic pigment and the like can be dissolved uniformly.

Examples of the organic solvent to be added include polyhydric alcohol-compound solvents, typified, for example, by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower monoalkyl ether-compound solvents of a polyhydric alcohol, such as ethylene glycol monomethyl (or ethyl) ether, diethylene glycol monomethyl (or ethyl) ether, and triethylene glycol monoethyl (or butyl) ether; polyether-compound solvents, such as ethylene glycol dimethyl ether (monoglyme), diethylene glycol dimethyl ether (diglyme), and triehtylene glycol dimethyl ether (triglyme); amide-compound solvents, such as dimethylformamide, dimethylacetamide, 2-pyrrolidone, N-methyl-2-pyrrolidone, 1,3-dimethyl-2-imidazolidinone, urea, and tetramethyl urea; sulfur-containing-compound solvents, such as sulfolane, dimethylsulfoxide, and 3-sulfolene; polyfinctional compound solvents, such as diacetone alcohol, and diethanolamine; carboxylic acid-compound solvents, such as acetic acid, maleic acid, docosahexaenoic acid, trichloroacetic acid, and trifluoroacetic acid; and sulfonic acid-compound solvents, such as methanesulfonic acid, and trifluorosulfonic acid. These solvents may be mixed in combination with two or more thereof, and used.

The organic solvent is preferably an amide-compound solvent or a sulfur-containing compound solvent in the case of alkaline, and a carboxylic acid-compound solvent, a sulfur-containing compound solvent or a sulfonic acid-compound solvent in the case of acidic; more preferably the sulfur-containing-compound solvent in the case of alkaline, and a sulfonic acid-compound solvent in the case of acidic; and particularly preferably dimethylsulfoxide (DMSO) in the case of alkaline, and methanesulfonic acid in the case of the acidic.

The blend ratio of water to the organic solvent is not particularly limited, as long as at the ratio it is possible to dissolve the pigment to be used homogeneously. The blend ratio of water to the organic solvent (water/organic solvent) is preferably from 0.05 to 10 (mass ratio) in the alkaline aqueous medium. In the case that an inorganic acid is used in the acidic aqueous medium, it is preferable to use, for example, sulfuric acid alone without using any organic solvent. When an organic acid(s) is used, the organic acid itself is an organic solvent. Thus, in order to adjust the viscosity and the solubility of the aqueous medium, a plurality of acids may be mixed or water may be added thereto. Preferably, the mass ratio of water to the organic solvent(s) (organic acid(s)) is from 0.005 to 0.1 (mass ratio).

In a method of producing an organic pigment dispersion liquid of the present invention, it is preferable that, in the case of mixing an organic pigment solution and an aqueous medium with a channel under the condition that they are in contact with each other, a uniformly dissolved solution is put in the flow path. When a suspension is introduced into the channel, the size of the particles therein may becomes large or pigment fine-particles having a wide particle size distribution may be generated. This results, as the case may be, to be apt to block the channel. In the present invention, the wording "homogeneously (or uniformly) dissolving" means a solution in which turbidity (muddiness) is hardly observed when the solution is observed under visible light. In the present invention, a solution obtained by filtration through a micro-filter having pores of 1 μm or less in diameter, or a solution which does not contain any substance remaining after the solution is filtrated through a filter having pores of 1 μm or less in diameter, is defined as a homogeneously (or uniformly) dissolved solution (or a homogeneous (or uniform) solution).

The following describes the hydrogen ion exponent (pH). The hydrogen ion exponent (pH) is the common logarithm of the reciprocal number of a hydrogen ion concentration (molar concentration), and may be called the hydrogen exponent. The hydrogen ion concentration is the concentration of hydrogen ion $H^+$ in a solution, and means the mole number of hydrogen ion present in a 1-liter solution. Since the hydrogen ion concentration changes in a very wide range, it is usually represented by the hydrogen ion exponent (pH). For example, pure water contains $10^{-7}$ mol of hydrogen ion at 1 atmosphere and 25° C. Thus, the pH thereof is 7, which is neutral. The aqueous solution having a pH of less than 7 is acidic, and the aqueous solution having a pH of more than 7 is alkaline. As a method of measuring the pH value, there are potentiometric and calorimetric measuring methods.

In a method of producing an organic pigment dispersion liquid of the present invention, it is preferable that, in the case of mixing an organic pigment solution and an aqueous medium with a channel under the condition that they are in contact with each other, the hydrogen ion exponent (pH) is changed in the step of causing the solution to flow in a channel, thereby producing pigment fine particles. This process is preferably performed using a channel having an introducing port different from an introducing port for the homogeneous solution of the organic pigment, for example, a channel having at least two introducing ports as illustrated in FIG. 1-1 or 2-1. Specifically, a homogeneous solution of an organic pigment is introduced into the introducing port 11 in FIG. 1-1 or the introducing port 21 in FIG. 2-1, and neutral, acidic or alkaline water or an aqueous solution in which a dispersing agent is dissolved is introduced into the introducing port 12 in FIG. 1-1 or the introducing port 22 in FIG. 2-1. The two solutions can be brought into contact with each other in the channel 13c or 23c, thereby changing the hydrogen ion concentration, that is, the hydrogen ion exponent (pH), of the solution containing the organic pigment toward neutrality (pH 7). In the case that the equivalent diameter of the channel is in a micro-scale, any flow therein has a small Reynolds number. Consequently, in this case, stable laminar flows (cylindrical laminar flows in FIG. 2-1) are formed, and water and ions diffuse and transfer through a stable interface between the two flows so that the hydrogen ion exponent (pH) of the solution containing the organic pigment can be gradually changed toward neutrality. The pigment may not easily dissolved in an aqueous medium at a low alkalinity or a low acidity, therefore, as the hydrogen ion exponent (pH) of the solution containing the organic pigment is changed toward neutrality, pigment fine particles can be gradually precipitated.

In the case that pigment fine particles are produced from a pigment dissolved in an alkaline aqueous medium, the change of the hydrogen ion exponent (pH) is generally performed within the range of 16.0 to 5.0, preferably 16.0 to 10.0. In the case that pigment fine particles are produced from a pigment dissolved in an acidic aqueous medium, the change of the hydrogen ion exponent (pH) is generally performed within the range of 1.5 to 9.0, preferably 1.5 to 4.0. The range of the change depends on the value of the hydrogen ion exponent (pH) of the organic pigment solution, but the range may be a range sufficient for promoting the precipitation of the organic pigment.

The pigment fine particles generated in a channel of a micro-scale flow into an outlet in the state that the particles are contained in one of the laminar flows, without diffusing. Therefore, when a channel apparatus having outlets designed, as illustrated in FIG. 3-1 or 4, is used, the laminar flow containing the organic pigment fine-particles can be separated. When this method is used, a high-concentration pigment dispersion liquid can be obtained, and simultaneously the water-soluble organic solvent, the alkaline or acidic water, and an excessive of the dispersing agent used to prepare the homogeneous solution can be removed. Thus, this process is advantageous. It is also possible to avoid the following: that the two solutions are finally mixed so that pigment crystals get coarse or deteriorate.

When pigment fine particles are produced, the reaction temperature is preferably within such a range that the solvent is not solidified or vaporized, and it is preferably from −20 to 90° C., more preferably from 0 to 50° C., and particularly preferably from 5 to 15° C.

The flow velocity (flow rate) of the fluid which flows in the channel is preferably from 0.1 mL/hour to 300 L/hour, more preferably from 0.2 mL/hour to 30 L/hour, further preferably from 0.5 mL/hour to 15 L/hour, and particularly preferably from 1.0 mL/hour to 6 L/hour.

In the present invention, the concentration of a substrate (such as an organic pigment or a reaction component thereof) is generally in the range of 0.5 to 20 mass %, and preferably in the range of 1.0 to 10 mass %.

In a method of producing an organic pigment dispersion liquid of the present invention, an organic pigment solution with a polymerizable compound added thereto and/or an aqueous medium with a polymerizable compound added thereto may be used, and a dispersant may further be added. The polymerizable compound and/or the dispersant has a function (1) in that it is rapidly adsorbed on the surface of the precipitated pigment, to form fine pigment particles, and (2) in that these particles are prevented from aggregating again. In a method of producing an oarganic pigment dispersion liquid of the present invention, as the dispersing agent, use can be made of an anionic, cationic, amphoteric, nonionic, pigmentary, low-molecular-weight, or polymer dispersing agent. These dispersing agents may be used alone or in combination. Dispersing agents to be used in dispersion of the pigment are described in detail in "Dispersion Stabilization of Pigment and Surface Treatment Technique/Evaluation" (published by Japan Association for International Chemical Information, on December 2001), pp. 29-46.

Examples of the anionic dispersing agent (anionic surfactant) include N-acyl-N-alkyltaurine salts, fatty acid salts, alkylsulfates, alkylbenzenesulfonates, alkylnaphthalenesulfonates, dialkylsulfosuccinates, alkylphosphates, naphthalenesulfonic acid/formalin condensates, and polyoxyethylenealkylsulfates. N-acyl-N-alkyltaurine salts are particularly preferable. As the N-acyl-N-alkyltaurine salts, those described in JP-A-3-273067 are preferable. These anionic dispersing agents may be used alone or in combination of two or more thereof.

Examples of the cationic dispersing agent (cationic surfactant) include quaternary ammonium salts, alkoxylated polyamines, aliphatic amine polyglycol ethers, aliphatic amines, diamines and polyamines derived from aliphatic amine and aliphatic alcohol, imidazolines derived from aliphatic acid, and salts of these cationic substances. These cationic dispersing agents may be used alone or in combination of two or more thereof.

The amphoteric dispersing agent is a dispersing agent having, in the molecule thereof, an anionic group moiety which the anionic dispersing agent has in the molecule, and a cationic group moiety which the cationic dispersing agent has in the molecule.

Examples of the nonionic dispersing agents (nonionic surfactant) include polyoxyethylenealkyl ethers, polyoxyethylenealkylaryl ethers, polyoxyethylene fatty acid esters, sorbitan fatty acid esters, polyoxyethylenesorbitan fatty acid esters, polyoxyethylenealkylamines, and glycerin fatty acid esters. Among these, polyoxyethylenealkylaryl ethers are preferable. These nonionic dispersing agents may be used alone or in combination of two or more thereof.

The pigmentary dispersing agent is defined as a dispersing agent derived from an organic pigment as a parent material, and prepared by chemically modifying a structure of the parent material. Examples of the pigmentary dispersing agent include sugar-containing pigmentary dispersing agents, piperidyl-containing pigmentary dispersing agents, naphthalene- or perylene-derivative pigmentary dispersing agents, pigmentary dispersing agents having a functional group linked through a methylene group to a pigment parent structure, pigmentary dispersing agents (parent structure) chemically modified with a polymer, pigmentary dispersing agents having a sulfonic acid group, pigmentary dispersing agents having a sulfonamido group, pigmentary dispersing agents having an ether group, and pigmentary dispersing agents having a carboxylic acid group, carboxylic acid ester group or carboxamido group.

Examples of the polymer dispersing agent, in particular, which can be preferably used in the second and third embodiments, include polyvinyl pyrrolidone, polyvinyl alcohol, polyvinyl methyl ether, polyethylene oxide, polyethylene glycol, polypropylene glycol, polyacrylamide, vinyl alcohol/vinyl acetate copolymer, partial-formal products of polyvinyl alcohol, partial-butyral products of polyvinyl alcohol, vinylpyrrolidone/vinyl acetate copolymer, polyethylene oxide/propylene oxide block copolymer, polyacrylic acid salts, polyvinyl sulfuric acid salts, poly(4-vinylpyridine) salts, polyamides, polyallylamine salts, condensed naphthalenesulfonic acid salts, styrene/acrylic acid salt copolymers, styrene/methacrylic acid salt copolymers, acrylic acid ester/acrylic acid salt copolymers, acrylic acid ester/methacrylic acid salt copolymers, methacrylic acid ester/acrylic acid salt copolymers, methacrylic acid ester/methacrylic acid salt copolymers, styrene/itaconic acid salt copolymers, itaconic acid ester/itaconic acid salt copolymers, vinylnaphthalene/acrylic acid salt copolymers, vinylnaphthalene/methacrylic acid salt copolymers, vinylnaphthalene/itaconic acid salt copolymers, cellulose derivatives, and starch derivatives. Besides, natural polymers can be used, examples of which include alginic acid salts, gelatin, albumin, casein, gum arabic, tragacanth gum, and ligninsulfonic acid salts. Polyvinyl pyrrolidone is particularly preferable. These polymer dispersing agents may be used alone or in combination of two or more thereof. In a method of the present invention, although molecular weight of the polymer dispersing agents is not particularly limited, weight average molecular weight thereof is preferably 5,000 to 1,000,000, more preferably 10,000 to 500,000.

With respect to the organic pigment dispersion liquid or the organic pigment fine particles produced according to the present invention, a polymer of a polymerizable compound is immobilized from the pigment fine particles. In the present invention, "immobile" means the state where the whole contained polymerizable compound (or a part thereof) is in contact with the pigment fine particles alone (or in a copolymerized state). At this time, the polymer may be present on the surface of the pigment fine particles or inside the pigment fine particles, as long as the whole polymer (or a part thereof) is in contact with the pigment fine particles, and the polymer preferably adheres to the fine particles so as not to desorb from the polymer even due to the movement of the fine particles in a dispersion liquid. Herein, the polymer means a compound generated as a result of the polymerization of at least two polymerizable compounds. The whole polymerizable compound on the fine particles is not required to participate in the polymerization reaction, and an unreacted polymerizable compound may remain. In a method of the present invention, although a polymerization degree of a polymer of the polymerizable compound is not particularly limited, a polymerization degree thereof is preferably 50 to 10,000, more preferably 100 to 5,000.

Any of a water-soluble and a water-insoluble polymerizable compound can be used as a polymerizable compound, and the polymerizable compound is not particularly limited, as long as the polymerizable compound can be dispersed with an organic pigment, an ethylenically unsaturated monomer is preferable. Specific examples thereof which can be used include: (meth)acrylic acid esters such as methyl acrylate, ethyl acrylate, butyl acrylate, benzyl acrylate, 2-ethylhexyl acrylate, phenyl acrylate, cyclohexyl acrylate, methyl methacrylate, ethyl methacrylate, butyl methacrylate, hexyl methacrylate, 2-ethylhexyl methacrylate, octyl methacrylate, cyclohexyl metharylate, β-hydroxyethyl acrylate, γ-aminopropyl acrylate, γ-hydroxypropyl acrylate, δ-hydroxybutyl acrylate, β-hydroxyethyl methacrylate, stearyl methacrylate, dimethylaminoethyl methacrylate, diethylene glycol methyl methacrylate, ethylene glycol ethyl dimethacrylate, tetraethylene glycol methyl dimethacrylate, and derivatives thereof; vinyl aromatic monomers such as styrene, o-methyl styrene, m-methyl styrene, p-methyl styrene, p-methoxy styrene, p-phenyl styrene, p-chlorostyrene, p-ethyl styrene, p-butyl styrene, p-t-butyl styrene, p-hexyl styrene, p-octyl styrene, p-nonyl styrene, p-decyl styrene, p-dodecyl styrene, 2,4-dimethyl styrene, 3,4-dichlorostyrene, α-methyl styrene, divinyl benzene, divinyl naphthalene, and derivatives thereof; vinyl esters such as vinyl acetate, vinyl propionate, vinyl benzoate, and derivatives thereof; and N-vinyl amides such as N-vinyl pyrrolidone; amide(meth)acrylates; alkyl-substituted (meth)acrylamides; methacryl amides; N-substituted maleimides; vinyl ethers such as vinyl methyl ether, vinyl ethyl ether, vinyl isobutyl ether, vinyl phenyl ether, divinyl ether, and derivatives thereof; olefins such as ethylene, propylene, isobutylene, 1-butene, 1-pentene, 4-methyl-1-penten, butadiene, isoprene, chloroprene, and derivatives thereof; diallyl phthalate; maleic anhydrides; (meth)acrylonitrile; methyl vinyl ketone; and vinylidene chloride.

Further, a water-soluble monomer having an anionic group such as a sulfonic group, a phosphoric group, or a carboxylic group is also used. An example thereof includes: a monomer having a carboxyl group such as acrylic acid, methacrylic acid, maleic acid, fumaric acid, itaconic acid, or p-vinyl benzoic acid; or an alkali metal salt, an alkaline earth metal salt, an ammonium salt, an amine salt or the like of the monomer. In addition, specific examples thereof include: styrene sulfonic acid, sodium styrene sulfonate, 2-acrylamide-2-methylpropane sulfonic acid, 2-hydroxy methyl methacryloyl phosphate, 2-hydroxy ethyl methacryloyl phosphate, and 3-chloro-2-hydroxy propyl methacryloyl phosphate. The monomers may be used alone or in combination.

A polymerizable compound whose molecules are separately provided with hydrophilic and hydrophobic functions is called a polymerizable surfactant, a reactive surfactant, or a reactive emulsifier, and can be preferably used in a method of producing an organic pigment dispersion liquid of the present invention. Examples of such a polymerizable compound include those having α,β-ethylenically unsaturated group (e.g., a vinyl group, an allyl group, a propenyl group, (meth) acryloyl group), a group capable of dissociating an ion such as a sulfonic group, or a salt thereof, and a hydrophilic group such as an alkyleneoxy group. These are an anionic or non-ionic surfactant that is generally used for emulsion polymerization, and has at least one unsaturated bond capable of effecting radical polymerization in a molecule.

In a method of producing an organic pigment dispersion liquid of the present invention, the polymerizable surfactant may be used alone or together with a different kind of a surfactant, or may be used together with a polymerizable compound other than the polymerizable surfactant. Examples of preferable polymerizable surfactants include those which are commercially available from Kao Corporation, Sanyo Chemical Industries, Ltd., Dai-ichi Kogyo Seiyaku Co., Ltd., Asahi Denka Kogyo K.K., Nippon Nyukazai Co., Ltd., Nippon Oil and Fats Co., Ltd., and the like, and those described in "Leading-edge technology of Fine Particle/Powder, Ch. 1 3: Fine particle Design using Reaction Emulsifier, pp. 23-31", 2000 CMC.

Hereinafter, specific examples of the polymerizable surfactant (including trade name) will be described. However, the present invention is not limited thereto.

[compound 1]

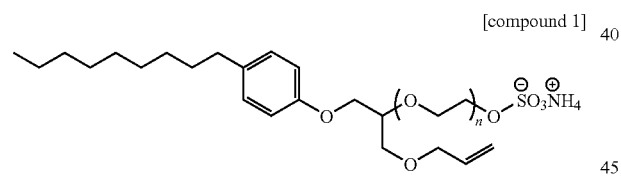

Asahi Denka Kogyo K.K.    ADEKA REASOAP SE-10N n = 10

[compound 2]

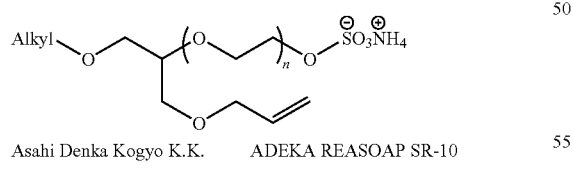

Asahi Denka Kogyo K.K.    ADEKA REASOAP SR-10 n = 10

[compound 3]

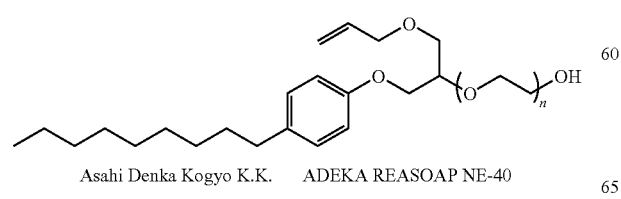

Asahi Denka Kogyo K.K.    ADEKA REASOAP NE-40 n = 40

[compound 4]

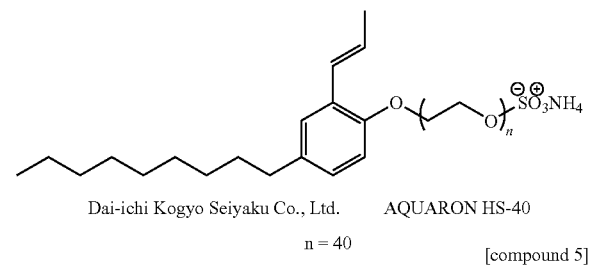

Dai-ichi Kogyo Seiyaku Co., Ltd.    AQUARON HS-40 n = 40

[compound 5]

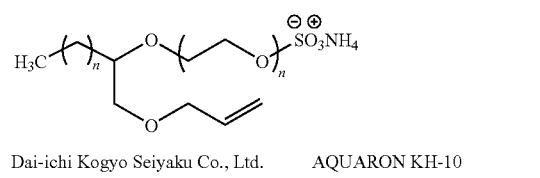

Dai-ichi Kogyo Seiyaku Co., Ltd.    AQUARON KH-10 n = 9 or 11    m = 10

[compound 6]

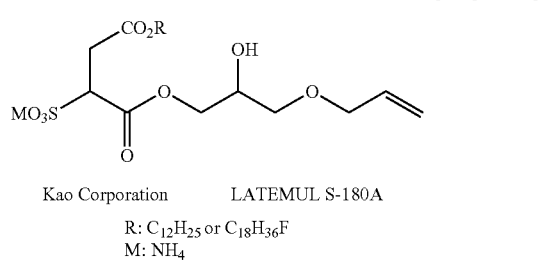

Kao Corporation    LATEMUL S-180A

R: $C_{12}H_{25}$ or $C_{18}H_{36}F$
M: $NH_4$

[compound 7]

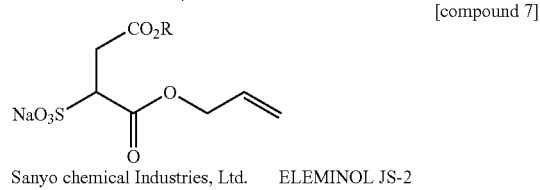

Sanyo chemical Industries, Ltd.    ELEMINOL JS-2

R: $C_{12}H_{25}$ etc.

[compound 8]

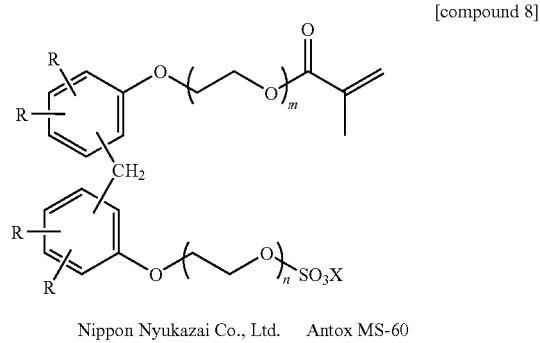

Nippon Nyukazai Co., Ltd.    Antox MS-60

R: Hydrogen, Alkyl group,
   Benzyl group, or Styrene group
X: Alkali metal, Alkali earth metal,
   Ammonium cation, or
   Amine cation
m = Integral number of 1 or more
n = Integral number of 1 or more A method of polymerizing a polymerizable compound used in a method of producing an organic pigment dispersion liquid of the present invention is not particularly limited, as long as it is capable of polymerizing a polymerizable compound in an organic pigment dispersion, and a method of polymerizing a polymerizable compound by generating a radical with a polymerization initiator is preferable. Although there are various factors for initiating polymerization, it is preferable to use heat, light, an ultrasonic wave, a microwave, or the like. As the polymerization initiator, a water-soluble or oil-soluble persulfate, peroxide, azo compound, or the like can be used. Specific examples thereof include ammonium persulfate, potassium persulfate, sodium persulfate, hydrogen peroxide, t-butylhydroperoxide, 2,2'-azobisisobutylonitrile, 2,2'-azobis(2-amidinopropane) dihydrochloride, 2,2'-azobis(2-N-benzylamidinopropane) dihydrochloride, and 2,2'-azobis[2-N-(2-hydroxyethyl)amidinopropane] dihydrochloride. For example, the homepage (www.wako-chem.co.jp) of Wako Pure Chemical Industries, Ltd. describes various kinds of water-soluble azo polymerization initiator, oil-soluble azo polymerization initiator, and polymer azo polymerization initiator together with 10-hour half-life temperatures and the structural formulas thereof, which are available. Although the addition amount of the polymerization initiator is not particularly limited, it is preferably 0.1 to 3% by weight, more preferably 1 to 20% by weight, and most preferably 2 to 10% by weight with respect to the entire monomer components.

In a method of producing an organic pigment dispersion liquid of the present invention, a polymerizable compound and a monomer to be copolymerized therewith may be copolymerized under the condition that they are present in a dispersion. There is no particular limit to a timing at which a copolymerization monomer is included. However, it is preferable that at least one of the organic pigment solution and the aqueous medium contains at least one copolymerization monomer. There is no particular limit to the copolymerization monomer, as long as it does not hinder the precipitation of fine particles and the stabilization of a dispersion, and examples thereof include the above-mentioned polymerizable compound and the like.

In a method of producing an organic pigment dispersion liquid of the present invention, various inorganic or organic functional additives may coexist in the dispersion liquid, irrespective of whether they are copolymerized or not. There is no particular limit to a timing at which the functional additive is included. However, for example, it is preferable that the functional additive is added to at least one of the organic pigment solution and the aqueous medium. There is no particular limit to the functional additive, as long as it does not hinder the precipitation of fine particles and the stabilization of a dispersion, and examples thereof include a sequestering agent, a disinfectant, a fungicide, an aroma chemical, an ultraviolet absorber, an antioxidant, a surface tension regulator, a water-soluble resin, a pH adjuster, and urea.

In a method of producing an organic pigment dispersion liquid of the present invention, an organic pigment is precipitated as fine particles, and a polymerizable compound in a dispersion is polymerized in this state, so that very high dispersion stability can be realized in the pigment dispersion liquid. This can be considered as follows. Since the polymerizable compound is present in the, course of the precipitation for forming fine particles from a pigment compound in a dissolved state, the polymerizable compound adsorbs to the precipitated fine particles in an integrated manner, and the fine particles can be surrounded by the polymerizable compound efficiently without any gap. Therefore, the adsorption state of the polymerizable compound can be obtained, the state which cannot be realized merely by mixing the pigment fine particles with the polymerizable compound. By polymerizing the polymerizable compound in the environment of precipitation, the polymerizable compound can be polymerized exactly so as to surround the entire surfaces of the pigment fine particles densely, and the polymerizable compound can be immobilized preferably firmly and uniformly so as not to desorb from the pigment fine particles. Particularly, in the case where the polymerizable compound is a polymerizable surfactant, it can adsorb to the surfaces of the fine particles more strongly to surround them, so that its stabilization can be further enhanced. Thus, according to the present invention, owing to the use of the polymerizable compound, both the size control function at a time of build-up and the encapsulation function after the build-up can be exhibited. This enables the pigment fine particles finely dispersed to be encapsulated as they are, and high dispersion stability and storage stability can be provided to the pigment fine particles with a nanometer size and a uniform particle diameter.

In a method of producing an organic pigment dispersion liquid of the present invention, the timing and method of polymerizing the polymerizable compound are not particularly limited. For example, taking the following two steps as an example, the polymerization reaction may be effected during the step (1) or after that, or during the step (2) or after that, or both in step (1) and step (2).

(1) Step for mixing a solution in which an organic pigment is dissolved with an aqueous medium.

(2) Step for concentrating and purifing a dispersion liquid after the mixing of (1).

Similarly, regarding the polymerization initiator, the timing and method of adding it are not particularly limited. For example, taking the following four embodiments as an example, the polymerization initiator may be added in any of the following aspects or in a combination thereof.

(1) The polymerization initiator is added to a solution in which an organic pigment is dissolved.

(2) The polymerization initiator is added to an aqueous medium.

(3) The polymerization initiator is added after mixing a solution in which an organic pigment is dissolved with an aqueous medium.

(4) The polymerization initiator is added after a dispersion liquid that has been mixed is concentrated and purified.

In a method of producing an organic pigment dispersion liquid of the present invention, the polymerizable compound is contained in at least one of the organic pigment solution and the aqueous medium, and is preferably contained in the organic pigment solution. In the case of simultaneously using the other polymerizable compound and dispersant, its embodiment is not particularly limited. For example, they may be dissolved in the organic pigment solution and the aqueous medium, each of them, or may be added to a dispersion liquid after mixing. Further, when fine particles are precipitated, liquid other than the organic pigment solution or the aqueous medium may be mixed if required, and at least three liquids may be mixed concurrently or successively.

The polymerization reaction temperature can be selected depending upon the kind of the polymerization initiator, and preferably 40° C. to 100° C., more preferably 50° C. to 90° C., and particularly preferably 50° C. to 80° C.

The polymerization reaction time may be 1 to 12 hours depending upon the polymerizable compound to be used, the concentration thereof, and the reaction temperature of the polymerization initiator.

Additives such as an ultraviolet absorber, an antioxidant, an aroma chemical, a fungicide, a surface tension regulator, a water-soluble resin, a disinfectant, a pH adjuster, and urea may be used simultaneously for the purpose of enhancing the solidity and the like of the pigment. The addition timing and method of these additives are not particularly limited. Taking the following four embodiments as an example, they may be added in any of the following aspects or in a combination thereof.

(1) Additives are added to a solution in which an organic pigment is dissolved.

(2) Additives are added to an aqueous medium.

(3) Additives are added after mixing a solution in which an organic pigment is dissolved with an aqueous medium.

(4) Additives are added after a dispersion that has been mixed is concentrated and purified.

In order to adjust the polymerization degree (molecular weight), various kinds of chain transfer agents (e.g., catechols, alcohols, thiols, mercaptans) may be used.

The content of the polymerizable compound and/or the dispersant is preferably in a range of 0.1 to 1000 parts by mass, more preferably 1 to 500 parts by mass, and particularly preferably 10 to 250 parts by mass with respect to 100 parts by mass of the pigment so as to further enhance the uniform dispersibility and storage stability of the pigment. When the content is less than 0.1 parts by mass, the dispersion stability of the organic pigment fine particles may not be enhanced.

Next, the organic pigment fine particles produced by a method of producing an organic pigment dispersion liquid of the present invention will be described.

In measuring methods of fine particles, the average size of the group of the particles can be expressed by a numerical value. Examples of the numerical value which is widely used, include mode diameter, which shows the maximum value of the particle size distribution; medium diameter, which corresponds to the central value of the integration distribution curve thereof; and various average diameters (such as length average, area average, weight average, number average, and volume average). The particle diameter size of the organic pigment fine particles produced by a method of the present invention is any size in a range, e.g., that does not clog a flow path, and is preferably 1 µm or less, more preferably 3 nm to 800 nm, and particularly preferably 5 nm to 500 nm in terms of the mode diameter. Further, in the case of a fine particle dispersion of a nanometer size, which is required in ink-jet ink of high image quality, the mode diameter of the organic pigment fine particles is set to be preferably 80 nm or less, more preferably 50 nm or less, and particularly preferably 30 nm or less.

Having a uniform particle size of fine-particles, i.e. having a monodisperse fine-particle system, is an important factor that decides performances of the particles, since not only it means that the particles included therein have uniform diameters but also it means that there is no fluctuation among particles in chemical composition and crystal structure inside the particles. In particular, this factor is regarded as important that governs the characteristics of the particles, in ultrafineparticles having nanometer order particle sizes. According to a method of producing an organic pigment dispersion liquid of the present invention, it is possible not only to set fine particles with a small particle diameter, but also to control the size thereof to make it uniform. As an index representing the uniformity of a size, an arithmetic standard deviation value is used. The arithmetic standard deviation value of the pigment fine particles produced by a method of producing an organic pigment dispersion liquid of the present invention is preferably 130 nm or less, more preferably 80 nm or less, and the peak of a particle size distribution can be made sharp. The arithmetic standard deviation value is obtained by dividing the value by two obtained by subtracting 16% particle diameter from 84% particle diameter of an integral distribution by a method of obtaining a standard deviation, assuming a particle size distribution as a normal distribution.

Further, a value (Mv/Mn) obtained by dividing a volume average particle diameter Mv by a number average particle diameter Mn may be expressed as an index of monodispersibility. In the present invention, unless otherwise particularly specified, the monodispersibility of the fine particles is represented as the value Mv/Mn, and when this value is closer to 1, the monodispersibility is more excellent. In the organic pigment fine particles of the present invention, the value Mv/Mn is preferably 1.80 or less, more preferably 1.60 or less, and most preferably 1.40 or less. The volume average particle diameter Mv and the number average particle diameter Mn can be measured, for example, by a dynamic light scattering method or the like.

Moreover, it is preferable that the stability of the organic pigment fine particles of the present invention is higher. The index representing the stability can be expressed as a change ratio of a particle diameter by storage treatment, for example, as a change ratio of the above-mentioned volume average particle diameter Mv. The change ratio of the organic pigment fine particles of the present invention is preferably 6.0% or less, more preferably 5.0% or less, and particularly preferably 4.0% or less, for example, when they are subjected to heating storage treatment, e.g., storage treatment at 60° C. to 80° C. for 50 to 300 hours.

In the method of producing an organic pigment dispersion liquid of the present invention, examples of a solvent to be used include an organic solvent, a dispersant, a surfactant, a polymerizable compound, an additive, water, and a combination thereof, respectively described above. If necessary, for example, a water-soluble organic solvent which is added to an ink composition, and other components may be added to the solvent. As these solvent components, for example, constituents of pigment dispersing agents, as described in JP-A-2002-194263 and JP-A-2003-26972, can be used.

Fluids to be mixed may be miscible with each other, or immiscible with each other. Examples of the fluids miscible with each other include: solutions containing the same organic solvents; solutions containing organic solvents having relatively close natures; and a combination of a solution containing an organic solvent high in polarity, such as methanol, and water. Examples of the fluids immiscible with each other include a combination of a solution containing a solvent of low polarity, such as hexane, and a solution containing a solvent of high polarity, such as methanol.

A gas, such as air, nitrogen, oxygen, argon, and helium may be used. In such a case, it may be dissolved in the reaction fluid(s) or introduced in the form of a gas into the channel. The method of introducing it as a gas is preferred.

According to the method of producing an organic pigment dispersion liquid of the present invention, an organic pigment is precipitated as fine particles, and the polymerization reaction of a polymerizable compound is effected in this state, whereby a polymerizable membrane can be formed and immobilized preferably on the fine particles. This means it is neither necessary to crush fine particles, to separate the produced fine particles, nor to switch the step facility by separating the produced fine particles. This is simply that a flow continuous production method can be introduced, and is advantageous in quality stabilization, step stabilization, and the large reduction in physical loss of a time, energy, and transfer.

The pigment dispersion liquid obtained in a method of producing an organic pigment dispersion liquid of the present invention can be purified, concentrated, and classified by filtering, centrifugation, or the like before and/or after polymerization. Further, in accordance with the use purpose, a solvent (a wetting agent, etc.), additives (a sequestering agent, a disinfectant, a fungicide, an aroma chemical, an ultraviolet absorber, an antioxidant, a surface tension regulator, a water-soluble resin, a pH adjuster, and urea, etc.), and the like may be added to adjust the liquid physical property.

The organic pigment dispersion liquid of the present invention is applicable for preferable ink-jet ink, for example. The method thereof is for example as follows. The organic pigment dispersion liquid of the present invention is purified and concentrated by centrifugation and/or ultrafiltration. Water-soluble organic solvent with a high boiling point such as glycerins and glycols are added to the resultant organic pigment dispersion to adjust the pH thereof to about 7 to 9. Further, an additive is added for the purpose of achieving satisfactory surface tension, viscosity, preservation, and the like, whereby ink-jet ink can be prepared. The preferable viscosity for use in ink-jet ink varies depending upon the kind and concentration of a pigment. In general, in the case of 5% by mass, the viscosity is preferably 20 mPa·s or less, more preferably 10 mPa·s (pascal second) or less, and most preferably 5 mPa·s or less.

In addition, the above-mentioned separation, concentration, adjustment of a liquid physical property, and the like are performed appropriately, whereby the organic pigment dispersion liquid can be used widely in a color filter, or the like.

According to a method of the present invention, organic pigment fine particles with a small size and a sharp particle size distribution peak can be obtained. Then, the polymerizable compound that coexists with the precipitated pigment fine particles is polymerized in a mixed solution, so that a polymer of the polymerizable compound can be immobilized from the pigment fine particles. Thus, the obtained organic pigment fine particles and the dispersion liquid thereof are excellent in dispersion stability and storage stability.

Further, according to a method of the present invention, the generation of fine particles of an organic pigment to the polymerization of a polymerizable compound can be performed continuously as a step (preferably in one tank). Then, a stable organic pigment with satisfactory purity can be obtained easily without requiring the separation of fine particles and the switching of steps. Further, organic pigment fine particles with a uniform particle diameter (i.e. mono-dispersed organic pigment fine particles) can be obtained under the control.

The present invention will be described in more detail based on the following examples, but the present invention is not limited thereto.

EXAMPLES

The pH shown in examples was measured with a glass electrode type hydrogen-ion concentration meter HM-40V (measurement range: pH 0 to 14) manufactured by Toa Denpa Kogyo Co. Ltd. The particle diameter distribution was measured with a Microtrack UPA150 manufactured by Nikkiso Co., Ltd. The viscosity was measured with an AMVn Automated Microviscometer (falling-ball capillary viscometer) manufactured by Anton Parr company.

Example 1

First, 0.5 g of 2,9-dimethylquinacridone (HOSTAPERM PINK E, manufactured by Clariant Co. Ltd.) was dissolved at room temperature in 5.0 mL of dimethylsulfoxide, 0.85 mL of methanol solution (manufactured by Wako Pure Chemical Industries, Ltd.) of 28% sodium methoxide, and 2.0 mL of a DMSO solution of 25% Aqualon KH-10 (manufactured by Dai-ichi Kogyo Seiyaku Co., Ltd.) (IA solution). The pH of the IA solution exceeded a measuring limit (pH 14), which was not able to be measured. Distilled water was designated as a IIA solution. They were allowed to pass through a microfilter of 0.45 μm (manufactured by Sartorius Co.), whereby impurities such as dust were removed. Next, the reaction was effected in the following procedure, using a simple reactor having a channel configuration of a reactor in FIG. 1-1. More specifically, two Teflon (Registered Trademark) tubes having a length of 50 cm and an equivalent diameter of 1 mm were connected to two inlets of a Teflon (Registered Trademark) Y-shaped connector (manufactured by Tokyo Rika Kikai Corporation) having an equivalent diameter of 500 μm, using a connector. At ends of the tubes, syringes respectively containing the IA and IIA solutions were connected and set at a pump. At an outlet of the connector, a Teflon (Registered Trademark) tube having a length of 1.5 m and an equivalent diameter of 500 μm was connected. The IA solution was sent out at a solution sending speed of 96 mL/h, and the IIA solution was sent out at a solution sending speed of 600 mL/h (Reynolds number: about 500). A dispersion liquid of 2,9-dimethylquinacridone was collected from the tip end of the outlet of the tube, and designated as Sample 1 for comparison. The pH of the sample 1 was about 13.0. The volume average particle diameter Mv of the Sample 1 was 23.5 nm, and the ratio of Volume average particle diameter Mv/Number average particle diameter Mn that is an index of monodispersibility was 1.57.

Next, the pigment dispersion liquid was purified with an ultrafilter (UHP-25K, differential molecular weight: 200,000, manufactured by Advantec Co., Ltd.) while distilled water was added so that the liquid amount was kept.

Further, potassium persulfide ($K_2S_2O_8$) corresponding to 5% amount of Aqualon KH-10 contained in the pigment dispersion liquid was added, followed by heating at 70° C. for 5 hours, whereby a sample 1a of the present invention was obtained. The volume average particle diameter Mv of the sample 1a was 19.5 nm, and the ratio of Volume average particle diameter Mv/Number average particle diameter Mn that is an index of monodispersibility was 1.52.

The samples 1 and 1a were subjected to heating storage treatment, respectively, at 70° C. for 100 hours. The change ratio of the volume average particle diameter of the sample 1 was 5.0% (Change ratio of a volume average particle diameter: a value obtained by dividing "the volume average particle diameter Mv after the heating storage treatment" by "the volume average particle diameter Mv before the heating storage treatment", followed by subtracting 1), and the change ratio of the volume average particle diameter of the sample 1a was 2.1%. Consequently, it is understood that the stability was enhanced by polymerization. Further, the above-mentioned difference in the change ratio of the volume average particle diameter caused by the heating storage treatment indicates that, for example, when the sample is used as ink-jet ink, long-term storage stability can be ensured, and a small change ratio indicates that such the sample is more preferable as ink.

Example 2

A dispersion liquid was produced in the same way as in Example 1, except that Aqualon KH10 was replaced by an equivalent mass of styrene (special grade manufactured by Wako Pure Chemical Industries, Ltd.) to obtain a sample 2 for comparison. The volume average particle diameter Mv of the sample 2 was 44.5 nm, and the ratio of Volume average particle diameter Mv/Number average particle diameter Mn that is an index of monodispersibility was 1.88.

Next, the pigment dispersion was purified with an ultrafilter (UHP-25K, differential molecular weight: 200,000, manufactured by Advantec Co., Ltd.) while distilled water was added so that the liquid amount was kept.

Further, $K_2S_2O_8$ corresponding to 1% amount of styrene contained in the pigment dispersion liquid was added, followed by heating at 70° C. for 5 hours, whereby a sample 2a of the present invention was obtained. The volume average particle diameter Mv of the sample 2a was 39.8 nm, and the ratio of Volume average particle diameter Mv/Number average particle diameter Mn that is an index of monodispersibility was 1.80.

The samples 2 and 2a were subjected to heating storage treatment, respectively, at 70° C. for 100 hours. The change ratio of the volume average particle diameter of the sample 2 was 6.0%, and the change ratio of the volume average particle diameter of the sample 2a was 4.1%. Consequently, it is understood that the stability was enhanced by polymerization.

Example 3

A sample 1b of the present invention subjected to polymerization was produced in the same way as in Example 1, except that ultrafiltration was not conducted. The sample 1b had an Mv of 23.1 nm and Mv/Mn of 1.54. Further, the change ratio of a volume average particle diameter when the sample 1b was subjected to heating storage treatment in the same way as in Example 1 was 2.4%. Consequently, it is understood that the stability was enhanced by polymerization.

Example 4

A dispersion liquid was produced and polymerization was performed in the same way as in Example 1, except that 0.5% $K_2S_2O_8$ aqueous solution was used as the IIA solution, the outlet of the connector was replaced by a Teflon (Registered Trademark) tube with a length of 10 m, and the whole tube except for both ends of 50 cm was soaked in an oil bath at 80° C. The volume average particle diameter Mv of the sample 2b was 20.4 μm, and the ratio of Volume average particle diameter Mv/Number average particle diameter Mn that is an index of monodispersibility was 1.55. The change ratio of the volume average particle diameter of the sample 2b after the heating storage treatment (70° C., 100 hours) was 2.2%. Consequently, it is understood that the stability was enhanced by polymerization.

Example 5

A stirrer was placed in a 50 mL beaker, and 25.0 mL of the IIA solution of Example 1 was stirred at room temperature. Then, 0.5 mL of the IA solution was poured to the IIA solution with a syringe to obtain a dispersion of 2,9-dimethylquinacridone (sample 3 for comparison). The pH of the sample 3 was about 12.1. The volume average particle diameter Mv of the sample 3 was 59.7 nm, and the ratio of Volume average particle diameter Mv/Number average particle diameter Mn that is an index of monodispersibility was 1.92.

A sample 3a of the present invention was produced, subjected to polymerization in the same way as in Example 1. The volume average particle diameter Mv of the Sample 3a was 46.5 nm, and the ratio of Volume average particle diameter Mv/Number average particle diameter Mn that is an index of monodispersibility was 1.78.

The samples 3 and 3a were subjected to heating storage treatment, respectively, at 70° C. for 100 hours. The change ratio of the volume average particle diameter of the sample 3 was 4.8%, and the change ratio of the volume average particle diameter of the sample 3a was 2.9%. Consequently, it is understood that the stability was enhanced by polymerization.

Example 6

A dispersion was produced in the same way as in Example 1, except that 10% of the whole amount of Aqualon KH-10 was replaced by polyvinylpyrolidone (K30, manufactured by Wako Pure Chemical Industries, Ltd.) to obtain a sample 4 for comparison. Further, the sample 4 was subjected to polymerization in the same way as in Example 1 to obtain a sample 4a of the present invention. The volume average particle diameter Mv of the sample 4 was 23.1 nm, and the ratio of Volume average particle diameter Mv/Number average particle diameter Mn that is an index of monodispersibility was 1.58. The volume average particle diameter Mv of the sample 4a was 22.4 nm, and the ratio of Volume average particle diameter Mv/Number average particle diameter Mn that is an index of monodispersibility was 1.56.

The samples 4 and 4a were subjected to heating storage treatment, respectively, at 70° C. for 100 hours. The change ratio of the volume average particle diameter of the sample 4 was 4.1%, and the change ratio of the volume average particle diameter of the sample 4a was 1.8%. Consequently, it is understood that the stability was enhanced by polymerization.

Example 7

First, 0.26 g of 2,9-dimethylquinacridone (HOSTAPERM PINK E, manufactured by Clariant Co., Ltd.) was dissolved at room temperature in 4.59 mL of 0.5 mol/L KOH ethanol solution (manufactured by Wako Pure Chemical Industries, Ltd.), and 21.2 mL of a DMSO solution of 1% Aqualon KH-10 (manufactured by Dai-ichi Kogyo Seiyaku Co., Ltd.) (IB solution). The pH of the IB solution exceeded a measuring limit (pH 14), which was not able to be measured. Separately, 0.75 g of a dispersant, sodium N-oleoyl-N-methyltaurine, was mixed with 90 mL of distilled water, to form a solution (designated as IIB solution). The pH of the IIB solution was 7.70. They were allowed to pass through a micro-filter of 0.45 μm (manufactured by Sartorius Co.), whereby impurities such as dust were removed. Next, the reaction was effected in the following procedure, using a simple reactor having a channel configuration of a reactor in FIG. 1-1. More specifically, two Teflon (Registered Trademark) tubes having a length of 50 cm and an equivalent diameter of 1 mm were connected to two inlets of a Teflon (Registered Trademark) Y-shaped connector (manufactured by Tokyo Rika Kikai Corporation) having an equivalent diameter of 500 μm, using a connector. At ends of the tubes, syringes respectively containing the IB and IIB solutions were connected and set at a pump. At an outlet of the connector, a Teflon (Registered Trademark) tube having a length of 1.5 m and an equivalent diameter of 500 μm was connected. The IB solution was sent out at a solution sending speed of 7.2 mL/h, and the IIB solution was sent out at a solution sending speed of 194.4 mL/h (Reynolds number: about 140). A dispersion liquid of 2,9-dimethylquinacridone was collected from the tip end of the outlet of the tube, and designated as Sample 5 for comparison. The pH of the sample 5 was about 11.0. The volume average particle diameter Mv of the Sample 5 was 60.7 nm, and the ratio of Volume average particle diameter Mv/Number average particle diameter Mn that is an index of monodispersibility was 1.97.

Next, the pigment dispersion liquid was purified with an ultrafilter (C10-T, differential molecular weight: 500,000, manufactured by Nitto Denko Matex Corporation) while distilled water was added so that the liquid amount was kept.

Further, VA-044 (manufactured by Wako Pure Chemical Industries, Ltd.; 10-hour half-life temperature: 44° C.) corresponding to 5% amount of Aqualon KH-10 contained in the pigment dispersion was added to the resultant solution, and the solution was heated at 60° C. for 2 hours while an ultrasonic wave was applied thereto in an ultrasonic cleaner to obtain a sample 5a. The volume average particle diameter Mv of the sample 5a was 48.7 nm, and the ratio of Volume average particle diameter Mv/Number average particle diameter Mn that is an index of monodispersibility was 1.85.

The samples 5 and 5a were subjected to heating storage treatment, respectively, at 70° C. for 100 hours. The change ratio of the volume average particle diameter of the sample 5 was 4.2%, and the change ratio of the volume average particle diameter of the sample 5a was 1.9%. Consequently, it is understood that the stability was enhanced by polymerization.

Example 8

Dispersion liquids were produced in the same way as in Example 1, except that 10% of the whole amount of Aqualon KH-10 was replaced by polymerizable compounds listed in Table 1 to obtain samples 6, 7, 8, 9, and 10 for comparison, respectively. They were subjected to polymerization in the same way as in Example 1, respectively, to obtain samples 6a, 7a, 8a, 9a, and 10a of the present invention. Table 1 shows the volume average particle diameter Mv and the volume average particle diameter Mv/number average particle diameter Mn of each sample. Table 1 also shows the measured change ratio of the volume average particle diameter Mv obtained by subjecting each sample to heating storage treatment in the same way as in Example 1.

TABLE 1

| Sample | Polymerizable compound | Mv (nm) | Mv/Mn | Change ratio of MV by heating storage treatment (%) |
|---|---|---|---|---|
| 6 | Styrene | 19.8 | 1.61 | 4.4 |
| 6a | | 18.9 | 1.60 | 3.3 |
| 7 | Methyl acrylate | 24.5 | 1.55 | 5.1 |
| 7a | | 22.2 | 1.49 | 2.8 |
| 8 | Vinyl acetate | 32.1 | 1.78 | 3.6 |
| 8a | | 28.0 | 1.72 | 2.9 |
| 9 | Divinyl ether | 29.3 | 1.66 | 4.1 |
| 9a | | 27.9 | 1.55 | 3.2 |
| 10 | Ethyl methacrylate (5%) | 33.0 | 1.89 | 4.9 |
| 10a | Sodium acrylate (5%) | 28.7 | 1.71 | 2.4 |

It is understood from the results shown in Table 1 that the stability of any pigment dispersion liquid was enhanced by the polymerization treatment.

Example 9

First, 0.5 g of 2,9-dimethylquinacridone (HOSTAPERM PINK E, manufactured by Clariant Co. Ltd.) was dissolved at room temperature in 9.15 mL of dimethylsulfoxide, 0.85 mL of methanol solution (manufactured by Wako Pure Chemical Industries, Ltd.) of 28% sodium methoxide, and 2.0 mL of a DMSO solution of 25% Aqualon KH-10 (manufactured by Dai-ichi Kogyo Seiyaku Co., Ltd.) (IC solution). The pH of the IC solution exceeded a measuring limit (pH 14), which was not able to be measured. Distilled water was designated as a IIC solution. They were allowed to pass through a microfilter of 0.45 μm (manufactured by Sartorius Co.), whereby impurities such as dust were removed. Next, the reaction was effected in the following procedure, using a reactor of FIG. 1-1. More specifically, two Teflon (Registered Trademark) tubes having a length of 50 cm and an equivalent diameter of 1 mm were connected to two inlets of a Teflon (Registered Trademark) Y-shaped connector (manufactured by Tokyo Rika Kikai Corporation) having an equivalent diameter of 500 μm, using a connector. At ends of the tubes, syringes respectively containing the IC and IIC solutions were connected and set at a pump. At an outlet of the connector, a Teflon (Registered Trademark) tube having a length of 1.5 m and an equivalent diameter of 500 μm was connected. The IC solution was sent out at a solution sending speed of 24 mL/h, and the IIC solution was sent out at a solution sending speed of 600 mL/h (Reynolds number: about 440). A dispersion liquid of 2,9-dimethylquinacridone was collected from the tip end of the outlet of the tube, and designated as Sample 11 for comparison. The pH of the sample 11 was about 12.4. The volume average particle diameter Mv of the Sample 11 was 16.1 nm, and the ratio of Volume average particle diameter Mv/Number average particle diameter Mn that is an index of monodispersibility was 1.48.

Next, the pigment dispersion liquid was purified with an ultrafilter (UHP-25K, differential molecular weight: 200,000, manufactured by Advantec Co., Ltd.) while distilled water was added so that the liquid amount was kept.

Further, $K_2S_2O_8$ corresponding to 5% amount of KH-10 contained in the pigment dispersion liquid was added, followed by heating at 70° C. for 5 hours, whereby a sample 11a of the present invention was obtained. The volume average particle diameter Mv of the sample 11a was 15.8 nm, and the ratio of Volume average particle diameter Mv/Number average particle diameter Mn that is an index of monodispersibility was 1.46.

The samples 11 and 11a were subjected to heating storage treatment, respectively, at 70° C. for 100 hours. The change ratio of the volume average particle diameter of the sample 11 was 3.3%, and the change ratio of the volume average particle diameter of the sample 11a was 2.5%. Consequently, it is understood that the stability was enhanced by polymerization.

Example 10

Dispersion liquids were produced in the same way as in Example 9, except that Aqualon KH-10 was replaced by an equivalent mass of polymerizable compounds listed in Table 2 to obtain samples 12, 13, and 14 for comparison, respectively. They were subjected to polymerization in the same way as in Example 9, respectively, to obtain samples 12a, 13a, and 14a of the present invention. Table 2 shows the volume average particle diameter Mv and the volume average particle diameter Mv/number average particle diameter Mn of each sample. Table 2 also shows the measured change ratio of the volume average particle diameter Mv obtained by subjecting each sample to heating storage treatment in the same way as in Example 9. Table 2 also shows the results of Example 9.

TABLE 2

| Sample | Polyermizable compound | Mv (nm) | Mv/Mn | Change ratio of MV by heating storage treatment (%) |
|---|---|---|---|---|
| 11 | KH-10 | 16.1 | 1.48 | 4.4 |
| 11a | Dai-ichi Kogyo Seiyaku Co., Ltd. | 15.5 | 1.44 | 3.3 |
| 12 | SR-10 | 20.7 | 1.56 | 4.2 |
| 12a | Asahi Denka Kogyo K.K. | 19.8 | 1.54 | 2.9 |
| 13 | HS-10 | 29.4 | 1.55 | 5.0 |
| 13a | Dai-ichi Kogyo Seiyaku Co., Ltd. | 27.7 | 1.47 | 3.9 |
| 14 | SE-10N | 22.2 | 1.50 | 3.1 |
| 14a | Asahi Denka Kogyo K.K. | 20.0 | 1.45 | 2.9 |

It is understood from the results shown in Table 2 that the stability of any pigment dispersion liquid was enhanced by the polymerization treatment.

Example 11

A dispersion liquid was produced in the same way as in Example 1, except that the reactor was replaced by the following reactor, and the procedure related thereto was changed. In a reactor having a cylindrical channel shown in FIG. 2-1 having a channel diameter D of 200 μm, a channel diameter E of 620 μm, and a channel length G of 10 cm, two Teflon (Registered Trademark) tubes were connected to introduction ports 21 and 22 with a connector. Syringes containing the IA and IIA solutions respectively prepared in Example 1 were connected to the ends of the introduction ports 21 and 22, and set at a pump. The IA solution was sent out at a solution sending speed of 48.0 mL/h, and the IIA solution was sent out at a solution sending speed of 600.0 mL/h (Reynolds number: about 460). A dispersion liquid of 2,9-dimethylquinacridone was collected from the tip end of the outlet of the tube, and designated as Sample 15 for comparison. The pH of the sample 15 was about 12.7. The volume average particle diameter Mv of the Sample 15 was 43.5 μm, and the ratio of Volume average particle diameter Mv/Number average particle diameter Mn that is an index of monodispersibility was 1.67.

Next, the pigment dispersion liquid was purified with an ultrafilter (UHP-43K, differential molecular weight: 200,000, manufactured by Advantec Co., Ltd.) while distilled water was added so that the liquid amount was kept.

Further, $K_2S_2O_8$ corresponding to 5% amount of KH-10 contained in the pigment dispersion liquid was added, followed by heating at 70° C. for 5 hours, whereby a sample 15a of the present invention was obtained. The volume average particle diameter Mv of the sample 15a was 37.8 nm, and the ratio of Volume average particle diameter Mv/Number average particle diameter Mn that is an index of monodispersibility was 1.66.

The samples 15 and 15a were subjected to heating storage treatment, respectively, at 70° C. for 100 hours. The change ratio of the volume average particle diameter of the sample 15 was 4.9%, and the change ratio of the volume average particle diameter of the sample 15a was 2.7%. Consequently, it is understood that the stability was enhanced by polymerization.

Example 12

A dispersion liquid was produced in the same way as in Example 1, except that 2,9-dimethylquinacridone was replaced by Pigment Yellow 128 (CROMOPHTAL YELLOW 8GN, manufactured by Ciba Specialty Chemicals company) to obtain a sample 16 for comparison. Further, the sample 16 was subjected to polymerization in the same way as in Example 1 to obtain a sample 16a of the present invention. The volume average particle diameter Mv of the sample 16 was 36.1 nm, and the ratio of Volume average particle diameter Mv/Number average particle diameter Mn that is an index of monodispersibility was 1.49. The volume average particle diameter Mv of the sample 16a was 25.4 nm, and the ratio of Volume average particle diameter Mv/Number average particle diameter Mn that is an index of monodispersibility was 1.50.

The samples 16 and 16a were subjected to heating storage treatment, respectively, at 70° C. for 100 hours. The change ratio of the volume average particle diameter of the sample 16 was 5.5%, and the change ratio of the volume average particle diameter of the sample 16a was 3.8%. It is understood from the results that the stability was enhanced by polymerization.

Example 13

A dispersion liquid was produced in the same way as in Example 1, except that 2,9-dimethylquinacridone was replaced by Pigment Blue 16 (disodium salt of phthalocyanine, manufactured by Tokyo Kasei Kogyo Co., Ltd.) and dimethylsulfoxide was replaced by N-methylpyrolidone to obtain a sample 17 for comparison. Further, the sample 17 was subjected to polymerization in the same way as in Example 1 to obtain a sample 17a of the present invention. The volume average particle diameter Mv of the sample 17 was 46.5 nm, and the ratio of Volume average particle diameter Mv/Number average particle diameter Mn that is an index of monodispersibility was 1.65. The volume average particle diameter Mv of the sample 17a was 43.4 nm, and the ratio of Volume average particle diameter Mv/Number average particle diameter Mn that is an index of monodispersibility was 1.60.

The samples 17 and 17a were subjected to heating storage treatment, respectively, at 70° C. for 100 hours. The change ratio of the volume average particle diameter of the sample 17 was 4.5%, and the change ratio of the volume average particle diameter of the sample 17a was 3.9%. It is understood from the results that the stability was enhanced by polymerization.

Example 14

First, 0.6 g of Pigment Red 254 (CROMOPHTAL RED 2030, manufactured by Ciba Specialty Chemicals company) was dissolved at room temperature in 4.88 mL of dimethylsulfoxide, 0.63 mL of an aqueous solution of 8 mol/L KOH (manufactured by Wako Pure Chemical Industries, Ltd.), and 2.18 mL of a DMSO solution of 25% Aqualon KH-10 (manufactured by Dai-ichi Kogyo Seiyaku Co., Ltd.) (ID solution). The pH of the ID solution exceeded a measuring limit (pH 14), which was not able to be measured. Distilled water was designated as a IID solution.

They were allowed to pass through a micro-filter of 0.45 μm (manufactured by Sartorius Co.), whereby impurities such as dust were removed. Next, the reaction was effected in the following procedure, using a reactor of FIG. 1-1. More specifically, two Teflon (Registered Trademark) tubes having a length of 50 cm and an equivalent diameter of 1 mm were connected to two inlets of a Teflon (Registered Trademark) Y-shaped connector (manufactured by Tokyo Rika Kikai Corporation) having an equivalent diameter of 500 μm, using a connector. At ends of the tubes, syringes respectively containing the ID and IID solutions were connected and set at a pump. At an outlet of the connector, a Teflon (Registered Trademark) tube having a length of 1.5 m and an equivalent diameter of 500 μm was connected. The ID solution was sent out at a solution sending speed of 96 mL/h, and the IID solution was sent out at a solution sending speed of 600 mL/h (Reynolds number: about 500). A dispersion liquid of Pigment Red 254 was collected from the tip end of the outlet of the tube, and designated as Sample 18 for comparison. The pH of the sample 18 was about 12.6. The volume average particle diameter Mv of the Sample 18 was 40.8 nm, and the ratio of Volume average particle diameter Mv/Number average particle diameter Mn that is an index of monodispersibility was 1.36.

Next, the pigment dispersion liquid was purified with an ultrafilter (UHP-25K, differential molecular weight: 200,000, manufactured by Advantec Co., Ltd.) while distilled water was added so that the liquid amount was kept.

Further, $K_2S_2O_8$ corresponding to 5% amount of Aqualon KH-10 contained in the pigment dispersion liquid was added, followed by heating at 70° C. for 5 hours, whereby a sample 18a of the present invention was obtained. The volume average particle diameter Mv of the sample 18a was 39.5 nm, and the ratio of Volume average particle diameter Mv/Number average particle diameter Mn that is an index of monodispersibility was 1.40.

The samples 18 and 18a were subjected to heating storage treatment, respectively, at 70° C. for 100 hours. The change ratio of the volume average particle diameter of the sample 18 was 4.1% (Change ratio of a volume average particle diameter: a value obtained by dividing "the volume average particle diameter Mv after the heating storage treatment" by "the volume average particle diameter Mv before the heating storage treatment", followed by subtracting 1), and the change ratio of the volume average particle diameter of the sample 18a was 2.0%. Consequently, it is understood that the stability was enhanced by polymerization.

Example 15

The samples 1 and 1a of Example 1 were purified with an ultrafilter (C10-T, differential molecular weight: 500,000, manufactured by Nitto Denko Matex Corporation) while distilled water was added so that the liquid amount was kept, and then concentrated to obtain 5% dispersions liquid. The viscosity of each sample was measured. The viscosity of the dispersion obtained by concentrating the sample 1 was 9.2 mPa·s, and the viscosity of the dispersion obtained by concentrating the sample la was 4.3 mPa·s. Thus, the sample subjected to polymerization had much lower viscosity, which shows that the dispersion of the present invention is more preferable as ink.

Example 16

3.0 g of Pigment Yellow 128 (CROMOPHTAL YELLOW 8GNP, manufactured by Ciba Specialty Chemicals company) were dissolved at room temperature together with 45.5 mL of dimethylsulfoxide, 2.49 mL of methanol solution (manufactured by Wako Pure Chemical Industries, Ltd.) of 28% sodium methoxide, 2.4 g of Aqualon KH-10 (manufactured by Dai-ichi Kogyo Seiyaku Co., Ltd.), 0.6 g of N-vinylpyrolidone (manufactured by Wako Pure Chemical Industries, Ltd.), 0.15 g of polyvinylpyrolidone K30 (manufactured by Tokyo Kasei Kogyo Co., Ltd.), and 1.5 g of VPE0201 (manufactured by Wako Pure Chemical Industries, Ltd.) (IE solution). The pH of the IE solution exceeded a measuring limit (pH 14), which was not able to be measured. Distilled water was designated as a IIE solution. They were allowed to pass through a micro-filter of 0.45 μm (manufactured by Sartorius Co.), whereby impurities such as dust were removed.

As the microreactor, a three-dimensional microreactor as shown in FIG. 8 having the following division number (number of flow paths) and the like was used.

(i) Number of supply flow paths (n) . . . divided into 5 with respect to each of two kinds of reaction solutions (10 flow paths in total are combined. In the microreactor shown in FIG. 8, eight flow paths in total (four each) are combined.)

(ii) Width (W) of the supply flow paths 91, 92 . . . 400 μm each (iii) Depth (H) of the supply flow paths 91, 92 . . . 400 μm each (iv) Diameter (D) of the combination region 90 . . . 800 μm (v) Diameter (R) of the micro-flow path 93 . . . 800 μm (vi) Cross angle of center axes of the respective supply flow paths 91, 92 and the micro-flow path 93 in the combination region 90 . . . 90°

(vii) Material for the microreactor . . . Stainless steel (SUS 304)

(viii) Flow path processing method . . . Micro-discharge processing method was performed, and three parts of the supply block 81, the combination block 82, and the reaction block 83 were sealed with a metal surface seal by mirror grinding. Two Teflon (Registered Trademark) tubes having a length of 50 cm and an equivalent diameter of 1 mm were connected to two inlets with a connector, and syringes respectively containing the IE and IIE solutions were connected to the ends of the inlets and set at a pump. A Teflon (Registered Trademark) tube having a length of 1.5 m and an equivalent diameter of 2 mm was connected to an outlet of the connector. The IE solution was sent out at a solution sending speed of 150 mL/min, and the IIE solution was sent out at a solution sending speed of 600 mL/min. A dispersion liquid of Pigment Yellow 128 was collected from the tip end of the outlet of the tube, and designated as Sample 19 for comparison. The pH of the sample 19 was about 13.2. The volume average particle diameter Mv of the Sample 19 was 25.2 nm, and the ratio of Volume average particle diameter Mv/Number average particle diameter Mn that is an index of monodispersibility was 1.50.

Further, Sample 19 was heated at 80° C. for 5 hours, whereby a sample 19a of the present invention was obtained. The volume average particle diameter Mv of the sample 19a was 25.5 nm, and the ratio of Volume average particle diameter Mv/Number average particle diameter Mn that is an index of monodispersibility was 1.48.

The samples 19 and 19a were purified with an ultrafilter (UHP-62K, differential molecular weight: 50,000, manufactured by Advantec Co., Ltd.) while distilled water was added so that the liquid amount was kept. Subsequently, the samples 19 and 19a were subjected to heating storage treatment, respectively, at 60° C. for 100 hours. The change ratio of the volume average particle diameter of the sample 19 was 4.1% (Change ratio of a volume average particle diameter: a value obtained by dividing "the volume average particle diameter Mv after the heating storage treatment" by "the volume average particle diameter Mv before the heating storage treatment", followed by subtracting 1), and the change ratio of the volume average particle diameter of the sample 19a was 2.0%. Consequently, it is understood that the stability was enhanced by polymerization.

Further, the sample 19a was purified and concentrated with an ultrafilter (UHP-62K, differential molecular weight: 50,000, manufactured by Advantec Co., Ltd.) while a filtrate was discharged. After this, the concentration was adjusted to obtain a 5.0% by mass of dispersion (sample 20). The viscosity thereof was 3.73 mPa·s. Then, the sample 20 was subjected to heating storage treatment at 60° C. for 100 hours, and further for 240 hours, with the results that the viscosity hardly changed (i.e., 3.73 mPa·s and 3.66 mPa·s). On the other hand, when the sample 19 was purified and concentrated similarly, the viscosity thereof was 7.83 mPa·s. When the sample 19 was further subjected to heating storage treatment at 60° C., the precipitation of the sample 19 was observed at a time of storage for 100 hours. The excellent viscosity stability owing to the heating storage treatment verifies the long-term storage stability, for example, when the sample is used as ink-jet ink, and shows that the sample is more preferable as ink.

Comparative Example 1

The IA solution and the IIA solution were sent out so that they came into contact with each other in a Y-shaped connector in the same way as in Example 1, except that Aqualon KH-10 was removed from the IA solution. Then, the Teflon (Registered Trademark) tube was clogged with a precipitated pigment immediately.

Comparative Example 2

A dispersion liquid was prepared in the same way as in Example 1, except that the whole amount of Aqualon KH-10 of Example 1 was replaced by polyvinylpyrolidone (K30, manufactured by Wako Pure Chemical Industries, Ltd.) to obtain a sample 20. The volume average particle diameter Mv of the sample 20 was 245.0 nm, and the ratio of Volume average particle diameter Mv/Number average particle diameter Mn that is an index of monodispersibility was 2.55. Further, Aqualon KH-10 corresponding to 30% amount of polyvinylpyrolidone contained in the pigment dispersion was added to the sample 20, followed by stirring at room temperature for one hour, and $K_2S_2O_8$ corresponding to 5% amount of Aqualon KH-10 was further added, followed by heating at 70° C. for 5 hours, whereby a sample 20a was obtained. The volume average particle diameter Mv of the sample 20a was 233.3 nm, and the ratio of Volume average particle diameter Mv/Number average particle diameter Mn that is an index of monodispersibility was 2.36.

The samples 20 and 20a were subjected to heating storage treatment, respectively, at 70° C. for 100 hours. The change ratio of the volume average particle diameter of the sample 20 was 15.1% (Change ratio of a volume average particle diameter: a value obtained by dividing the volume average particle diameter Mv after the heating storage treatment by the volume average particle diameter Mv before the heating storage treatment, followed by subtracting 1), and the change ratio of the volume average particle diameter of the sample 20a was 14.8%.

Having described our invention as related to the present embodiments, it is our intention that the invention not be limited by any of the details of the description, unless otherwise specified, but rather be construed broadly within its spirit and scope as set out in the accompanying claims.

This nonprovisional application claims priority under 35 U.S.C. § 119 (a) on Patent Application No. 2005-197971 filed in Japan on Jul. 6, 2005 and No. 2006-078637 filed in Japan on Mar. 22, 2006, which are herein incorporated by reference.

What we claim is:

1. A method of producing an organic pigment dispersion liquid, which comprises the steps of:
providing an alkaline or acidic solution with an organic pigment dissolved therein and an aqueous medium, wherein a polymerizable compound is contained in at least one of the organic pigment solution and the aqueous medium;
mixing the organic pigment solution and the aqueous medium; and thereby
forming the pigment as fine particles, then
polymerizing the polymerizable compound to form a polymer immobile from the pigment fine particles.

2. The method of producing an organic pigment dispersion liquid according to claim 1, wherein the solution of which the organic pigment is dissolved is alkaline solution.

3. The method of producing an organic pigment dispersion liquid according to claim 1, wherein the organic pigment solution is a homogeneous solution in which the organic pigment is dissolved in a homogeneous mixed solvent of water and an organic solvent.

4. The method of producing an organic pigment dispersion liquid according to claim 1, further comprising the step of changing a hydrogen ion exponent (pH) in the course of mixing the organic pigment solution and the aqueous medium.

5. The method of producing an organic pigment dispersion liquid according to claim 1, further comprising the steps of: flowing the organic pigment solution and the aqueous medium into a channel having an equivalent diameter of 1 mm or less to be a continuous liquid flow; and mixing said solution and said medium for bringing them into contact with each other for said mixing step.

6. The method of producing an organic pigment dispersion liquid according to claim 1, further comprising the steps of: flowing the organic pigment solution and the aqueous medium into a channel to be a laminar flow; wherein said solution and said medium are brought into contact with each other in the course of the laminar flow for said mixing step.

7. The method of producing an organic pigment dispersion liquid according to claim 6, wherein the channel is a micro-reaction site.

8. The method of producing an organic pigment dispersion liquid according to claim 7, wherein an equivalent diameter of the channel is 10 mm or less.

9. The method of producing an organic pigment dispersion liquid according to claim 1, wherein the polymerizable compound is a polymerizable surfactant.

10. The method of producing an organic pigment dispersion liquid according to claim 1, wherein at least one dispersing agent is contained in at least one of the organic pigment solution and the aqueous medium.

11. The method of producing an organic pigment dispersion liquid according to claim 10, wherein at least one of the dispersing agents is a polymer dispersing agent.

12. The method of producing an organic pigment dispersion liquid according to claim 1, wherein at least one monomer copolymerizable with the polymerizable compound is contained in at least one of the organic pigment solution and the aqueous medium.

13. The method of producing an organic pigment dispersion liquid according to claim 1, wherein organic pigment fine particles are obtained in a dispersion liquid.

14. The method of producing an organic pigment dispersion liquid according to claim 6, wherein an equivalent diameter of the channel is 1 mm or less.

15. Organic pigment fine particles obtained in accordance with a method of claim 1, wherein a mode diameter of the fine particles is 1 μm or less.

16. The method of producing an organic pigment dispersion liquid according to claim 1, which further comprises,
flowing the organic pigment solution and the aqueous medium into a channel as a continuous liquid flow;
dividing at least one of the organic pigment solution and the aqueous medium into a plurality of solutions; and
combining the organic pigment solution and the aqueous medium such that a central axis of at least one divided solution of the plurality of divided solutions and the central axis of the organic pigment solution or the aqueous medium different from the at least one divided solution, intersect at one point in a combining region, thereby to mix the organic pigment solution and aqueous medium.

17. The method of producing an organic pigment dispersion liquid according to claim 16, which further comprises the steps of: flowing the organic pigment solution and the aqueous medium into a channel having an equivalent diameter of 1 mm or less to be a continuous liquid flow; wherein said solution and said medium are brought into contact with each other for said mixing step.

18. The method of producing an organic pigment dispersion liquid according to claim 16, which further comprises the steps of: flowing the organic pigment solution and the aqueous medium into a channel to be a laminar flow; wherein said solution and said medium are brought into contact with each other in the course of the laminar flow for said mixing step.

19. The method of producing an organic pigment dispersion liquid according to claim 18, wherein the channel is a micro-reaction site.

20. The method of producing an organic pigment dispersion liquid according to claim 1, wherein organic pigment solution and the aqueous medium are mixed under conditions of a continuous flow system or a liquid plug system to control the liquid flow.

21. A method of producing an organic pigment dispersion liquid, which comprises the steps of:
providing an alkaline or acidic solution with an organic pigment dissolved therein and an aqueous medium, wherein a polymerizable compound is contained in at least one of the organic pigment solution and the aqueous medium;
mixing the organic pigment solution and the aqueous medium by flowing the organic pigment solution and the aqueous medium into a channel having an equivalent diameter of 1 mm or less to be a continuous liquid flow; wherein said solution and said medium are brought into contact with each other; and thereby
forming the pigment as fine particles, then
polymerizing the polymerizable compound to form a polymer immobile from the pigment fine particles.

22. A method of producing an organic pigment dispersion liquid, which comprises the steps of:
providing an alkaline or acidic solution with an organic pigment dissolved therein and an aqueous medium, wherein a polymerizable compound is contained in at least one of the organic pigment solution and the aqueous medium;
mixing the organic pigment solution and the aqueous medium by flowing the organic pigment solution and the aqueous medium into a channel to be a laminar flow; wherein said solution and said medium are brought into contact with each other in the course of the laminar flow for said mixing step; and thereby
forming the pigment as fine particles, then
polymerizing the polymerizable compound to form a polymer immobile from the pigment fine particles.

* * * * *